United States Patent
Ettema et al.

(10) Patent No.: US 9,882,929 B1
(45) Date of Patent: *Jan. 30, 2018

(54) DYNAMIC SELECTION AND GENERATION OF A VIRTUAL CLONE FOR DETONATION OF SUSPICIOUS CONTENT WITHIN A HONEY NETWORK

(71) Applicant: Palo Alto Networks, Inc., Santa Clara, CA (US)

(72) Inventors: Taylor Ettema, San Jose, CA (US); Huagang Xie, Pleasanton, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/503,129

(22) Filed: Sep. 30, 2014

(51) Int. Cl.
| | | |
|---|---|---|
| H04L 29/06 | (2006.01) | |
| G06F 9/455 | (2006.01) | |
| G06F 21/55 | (2013.01) | |

(52) U.S. Cl.
CPC ........ *H04L 63/145* (2013.01); *G06F 9/45533* (2013.01); *H04L 63/1491* (2013.01); *G06F 21/552* (2013.01)

(58) Field of Classification Search
CPC ...... G06F 21/567; G06F 21/53; G06F 21/552; H04L 63/1491; H04L 63/1408
USPC ........................................................ 726/22
See application file for complete search history.

(56) References Cited

U.S. PATENT DOCUMENTS

| | | |
|---|---|---|
| 5,623,600 A | 4/1997 | Ji et al. |
| 5,842,002 A | 11/1998 | Schnurer et al. |
| 6,151,635 A | 11/2000 | Bare |
| 6,357,008 B1 | 3/2002 | Nachenberg |
| 6,775,780 B1 | 8/2004 | Muttik |
| 7,370,360 B2 | 5/2008 | van der Made |
| 7,409,719 B2 | 8/2008 | Armstrong et al. |
| 7,664,626 B1 | 2/2010 | Ferrie |

(Continued)

FOREIGN PATENT DOCUMENTS

| | | |
|---|---|---|
| WO | 2008054952 | 8/2008 |
| WO | 2012092251 | 7/2012 |

(Continued)

OTHER PUBLICATIONS

Chen et al., Towards an Understanding of Anti-Virtualization and Anti-Debugging Behavior in Modern Malware, 2008.

(Continued)

*Primary Examiner* — Hadi Armouche
*Assistant Examiner* — Bryan Wright
(74) *Attorney, Agent, or Firm* — Van Pelt, Yi & James LLP

(57) ABSTRACT

Techniques for dynamic selection and generation of detonation location of suspicious content with a honey network are disclosed. In some embodiments, a system for dynamic selection and generation of detonation location of suspicious content with a honey network includes a virtual machine (VM) instance manager that manages a plurality of virtual clones executed in an instrumented VM environment, in which the plurality of virtual clones executed in the instrumented VM environment correspond to the honey network that emulates a plurality of devices in an enterprise network; and an intelligent malware detonator that detonates a malware sample in at least one of the plurality of virtual clones executed in the instrumented VM environment.

22 Claims, 11 Drawing Sheets

(56) References Cited

U.S. PATENT DOCUMENTS

| | | | |
|---|---|---|---|
| 7,725,937 B1 | 5/2010 | Levy | |
| 8,060,074 B2 | 11/2011 | Danford et al. | |
| 8,151,352 B1 | 4/2012 | Novitchi | |
| 8,341,749 B2 | 12/2012 | Rogel | |
| 8,365,297 B1 | 1/2013 | Parshin et al. | |
| 8,370,932 B2 | 2/2013 | Adams | |
| 8,473,931 B2 | 6/2013 | Wu | |
| 8,505,097 B1 | 8/2013 | Juels | |
| 8,533,778 B1* | 9/2013 | Dalcher | G06F 21/53 711/6 |
| 8,555,386 B1 | 10/2013 | Belov | |
| 8,813,226 B2 | 8/2014 | Chung et al. | |
| 8,832,836 B2 | 9/2014 | Thomas et al. | |
| 8,918,877 B1 | 12/2014 | Xie et al. | |
| 8,990,944 B1 | 3/2015 | Singh et al. | |
| 8,966,625 B1 | 4/2015 | Zuk et al. | |
| 9,009,823 B1 | 4/2015 | Ismael et al. | |
| 9,021,092 B2 | 4/2015 | Silva et al. | |
| 9,021,260 B1 | 4/2015 | Falk et al. | |
| 9,027,135 B1* | 5/2015 | Aziz | H04L 63/1408 726/23 |
| 9,038,185 B2 | 5/2015 | Livshits et al. | |
| 9,100,428 B1 | 8/2015 | Visbal | |
| 9,104,870 B1 | 8/2015 | Qu et al. | |
| 9,159,035 B1 | 10/2015 | Ismael et al. | |
| 9,165,142 B1 | 10/2015 | Sanders et al. | |
| 9,171,160 B2 | 10/2015 | Vincent et al. | |
| 9,176,843 B1 | 11/2015 | Ismael et al. | |
| 9,178,900 B1 | 11/2015 | Li et al. | |
| 9,215,239 B1 | 12/2015 | Wang et al. | |
| 9,223,972 B1 | 12/2015 | Vincent et al. | |
| 9,262,635 B2 | 2/2016 | Paithane et al. | |
| 9,294,442 B1 | 3/2016 | Lian | |
| 9,336,103 B1 | 5/2016 | Hasbe et al. | |
| 9,367,681 B1 | 6/2016 | Ismael et al. | |
| 9,736,179 B2 | 8/2017 | Ismael | |
| 2002/0184528 A1 | 12/2002 | Shevenell et al. | |
| 2003/0208602 A1* | 11/2003 | Bhalla | H04L 29/12066 709/227 |
| 2004/0078592 A1 | 4/2004 | Fagone et al. | |
| 2006/0010209 A1* | 1/2006 | Hodgson | H04L 12/585 709/206 |
| 2006/0018466 A1* | 1/2006 | Adelstein | H04L 63/1491 380/46 |
| 2006/0112174 A1 | 5/2006 | L'Heureux | |
| 2007/0101430 A1* | 5/2007 | Raikar | H04L 12/585 726/24 |
| 2007/0208822 A1 | 9/2007 | Wang | |
| 2007/0261112 A1* | 11/2007 | Todd | G06F 21/577 726/11 |
| 2008/0098476 A1* | 4/2008 | Syversen | H04L 63/0227 726/23 |
| 2008/0271019 A1* | 10/2008 | Stratton et al. | G06F 21/577 718/1 |
| 2009/0198817 A1 | 8/2009 | Sundaram et al. | |
| 2009/0204964 A1 | 8/2009 | Foley et al. | |
| 2009/0241191 A1 | 9/2009 | Keromytis | |
| 2009/0288084 A1 | 11/2009 | Astete et al. | |
| 2010/0122343 A1* | 5/2010 | Ghosh | G06F 21/55 726/23 |
| 2011/0004676 A1 | 1/2011 | Kawato | |
| 2011/0321165 A1 | 12/2011 | Capalik et al. | |
| 2012/0054396 A1 | 3/2012 | Bhattacharya et al. | |
| 2012/0192175 A1 | 7/2012 | Dorai et al. | |
| 2012/0240236 A1 | 9/2012 | Wyatt et al. | |
| 2012/0290848 A1 | 11/2012 | Wang et al. | |
| 2012/0304244 A1 | 11/2012 | Xie et al. | |
| 2012/0324446 A1 | 12/2012 | Fries et al. | |
| 2013/0007732 A1 | 1/2013 | Fries et al. | |
| 2013/0074186 A1 | 3/2013 | Muttik | |
| 2013/0117848 A1 | 5/2013 | Golshan et al. | |
| 2013/0145465 A1* | 6/2013 | Wang | G06F 21/552 726/23 |
| 2013/0283264 A1* | 10/2013 | Bhattacharya | G06F 9/45558 718/1 |
| 2014/0096229 A1* | 4/2014 | Burns | H04L 63/1491 726/15 |
| 2014/0115706 A1* | 4/2014 | Silva | H04L 63/1425 726/23 |
| 2014/0137255 A1 | 5/2014 | Wang et al. | |
| 2014/0143536 A1 | 5/2014 | Holland et al. | |
| 2014/0157058 A1 | 6/2014 | Bennah et al. | |
| 2014/0201836 A1 | 7/2014 | Amsler | |
| 2014/0229939 A1 | 8/2014 | Dias de Asuncao et al. | |
| 2014/0245444 A1 | 8/2014 | Lutas et al. | |
| 2014/0337836 A1 | 11/2014 | Ismael | |
| 2014/0351934 A1* | 11/2014 | Mitra | G06F 21/567 726/23 |
| 2014/0380474 A1 | 12/2014 | Paithane et al. | |
| 2015/0058983 A1 | 2/2015 | Zeitlin et al. | |
| 2015/0067862 A1 | 3/2015 | Yu et al. | |
| 2015/0096025 A1 | 4/2015 | Ismael | |
| 2015/0199343 A1 | 7/2015 | Dabak | |
| 2015/0220735 A1 | 8/2015 | Paithane et al. | |
| 2015/0244730 A1 | 8/2015 | Vu et al. | |
| 2015/0248554 A1* | 9/2015 | Dumitru et al. | G06F 21/53 726/1 |
| 2015/0326588 A1 | 11/2015 | Vissamsetty | |
| 2015/0326599 A1* | 11/2015 | Vissamsetty | H04L 63/02 726/11 |
| 2016/0004869 A1 | 1/2016 | Ismael et al. | |
| 2016/0042179 A1 | 2/2016 | Weingarten et al. | |
| 2016/0080415 A1 | 3/2016 | Wu | |
| 2016/0149950 A1* | 5/2016 | Ashley | G06F 9/45533 726/23 |

FOREIGN PATENT DOCUMENTS

| | | |
|---|---|---|
| WO | 2012092252 | 7/2012 |
| WO | 2013067505 | 5/2013 |
| WO | 2013067508 | 5/2013 |

OTHER PUBLICATIONS

Garfinkel et al., Compatibility is Not Transparency: VMM Detection Myths and Realities, Mar. 2, 2014.

Yin et al., Panorama: Capturing System-Wide Information Flow for Malware Detection and Analysis, Carnegie Mellon University, Research Showcase @CMU, Department of Electrical and Computer Engineering, 2007.

Baecher et al., The Nepenthes Platform: An Efficient Approach to Collect Malware, RAID 2006, LNCS 4219, pp. 165-184, 2006.

Jiang et al., Stealthy Malware Detection Through VMM-Based "Out-of-the-Box" Semantic View Reconstruction, 2007.

Blasing et al., An Android Application Sandbox System for Suspicious Software Detection, 2010.

King et al., SubVirt: Implementing Malware with Virtual Machines, 2006.

Hecker et al., Automated Honeynet Deployment for Dynamic Network Environment, IEEE, 46th Hawaii International Conference on System Sciences, Jan. 7-10, 2013.

Provos et al., Virtual Honeypots: From Botnet Tracking to Intrusion Detection, Pearson Education, 2007 ISBN 10: 0-321-33632-1 Entire Book Is Being Submitted.

Roger A. Grimes, Honeypots for Windows, Apress, 2005 ISBN 1-59059-335-9 Entire Book Is Being Submitted.

Author Unknown, The Honeywell Project, Know Your Enemy: Learning about Security Threats, Second Edition, Addison Wesley, 2004 ISBN 0-321-16646-9 Entire Book Is Being Submitted.

* cited by examiner

DYNAMIC SELECTION AND GENERATION OF A VIRTUAL CLONE FOR DETONATION OF SUSPICIOUS CONTENT WITHIN A HONEY NETWORK

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
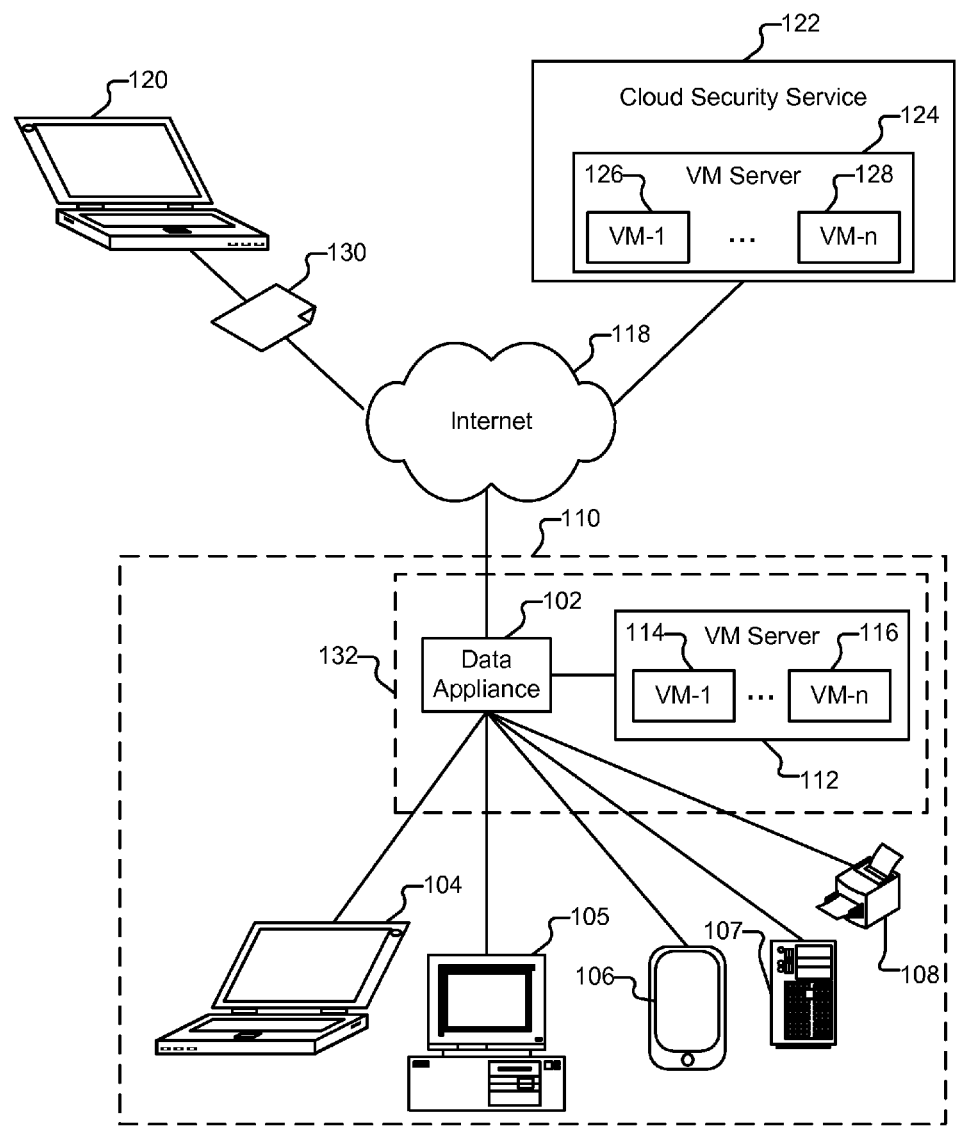
FIG. 1 is a diagram of an architecture for performing a dynamic analysis of advanced threats in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis for Advanced Threats

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

In particular, modern attackers are increasingly using targeted and new unknown variants of malware to avoid detection by traditional security solutions. For example, advanced security threats (e.g., advanced cyber-attacks) are employing stealthy, persistent methods to evade traditional security measures. Skilled adversaries (e.g., attackers) demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving advanced threats. For example, by executing suspect files (e.g., malware samples) in a virtual environment (e.g., an instrumented virtual environment, which is sometimes also referred to as using a sandbox analysis of malware samples that can be instrumented with various user level and/or kernel level hooks for monitoring behaviors of programs executing and/or monitoring various network activities, which can be unknown threats) and observing their behavior, such malware can be quickly and accurately identified, even if the malware sample has not been previously analyzed and detected.

Once a file is deemed malicious (e.g., a malware sample is deemed to be malware), protections can be automatically generated using, for example, a cloud security service (e.g., implementing a dynamic security analysis of malware samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack, and/or other aspects (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis). As disclosed herein, the cloud security service identifies unknown malware and zero-day exploits by directly executing them in a scalable cloud-based, virtual sandbox environment (e.g., an instrumented virtual environment (also referred to herein as a virtual machine (VM) environment), which are provided by commercially available cloud security services, such as WildFire offered by Palo Alto Networks, Inc., which provides for dynamic analysis to identify and block unknown threats). In one embodiment, the cloud security service automatically creates and disseminates protections in near real-time to help security teams meet the challenge of advanced security threats. In an example implementation, the cloud security service extends the next-generation firewall platform that natively classifies all traffic across many different applications, and the cloud security service can apply a behavioral analysis regardless of ports or encryption, including full visibility into web traffic, email protocols (SMTP, IMAP, POP), FTP, SMB, and/or other protocols to facilitate detection and dissemination protections in near real-time to respond to such advanced security threats.

However, existing techniques for using an instrumented virtual machine (VM) environment can be detected by a skilled attacker, because the attacker may be able to detect whether their malware is executing in the target host and/or target network environment or in a VM environment (e.g., sandbox for security analysis). For example, existing sandbox approaches to malware detection typically only install one version of software (e.g., applications or other software) per virtual machine instance. As another example, some other existing approaches execute multiple virtual machine (VM) instances with different software configurations (e.g., in which such multiple VM instances can be executed sequentially or simultaneously in a VM environment). Regardless, such approaches fail to synchronize various different attributes associated with a target host and the VM instance(s). Moreover, such approaches fail to emulate other devices in the VM environment, such as devices that the target host can communicate with in the target network environment (e.g., a network printer, a file share/server, a DNS server, an email server, a proxy server, other client devices, and/or other devices in the target network environment).

As such, current approaches to implementing VM environments for providing malware detection and security analysis generally perform analysis of discrete events (e.g., downloading of potential malware—a malware sample) and any subsequent activity in a stand-alone sandbox (e.g., in which a stand-alone sandbox is typically executing one or more VM instances using fixed configurations, which can be implemented using a cloud solution and/or appliance-based solution). For example, existing approaches only attempt to emulate a single host, which may be allowed to have external Internet access but do not allow for local network communications in the local target network. Further, such approaches typically only allow for a limited analysis time (e.g., 1 to 5 minutes of execution time using the VM instance executed in the instrumented VM environment), which fails to provide for a realistic environment. For example, APT attacks are usually over a longer period of time and performed by a more skilled attacker who would typically be attempting a targeted attack (e.g., directing malware and/or communications to a targeted host) such that such an attacker would often be able to detect that the VM instance does not have the previously observed and/or expected attributes associated with the target host. As another example, an attacker attempting an APT attack typically targets a host in a target network and, thus, expects to see other devices in a network environment that can be in communication with the target host (e.g., in some cases, based on prior reconnaissance of the target network environment by the attacker, such as based on logs and/or local configuration data on the target host and/or network scans of devices on the target network environment, such as using Nmap or other network scanning tools).

As a result, existing approaches to implementing VM environments for security analysis are insufficient to overcome various anti-VM techniques used by attackers or unauthorized users that can detect whether or not their malware is executing in a VM environment and/or whether their communications have been redirected from a target host to a VM instance in the VM environment. In particular, typical VM environments for security analysis fail to provide a realistic emulation of a target host and a target network environment that would be expected by skilled attackers, such as an attacker attempting to perform an APT attack on a target host in a target network environment (e.g., as such an attacker would typically have examined that host and target network environment to some extent in the past and, thus, would be able to compare such to the VM instance in the VM environment and likely be able to determine that such is not the actual target host in the target network environment and/or based on various attributes, such as configuration settings or logs that can be used by the attacker to infer the presence of a sandbox environment). Even if the VM instance in the VM environment is configured in a manner that can fool the attacker (e.g., such as by using a customized VM that has some attributes that may match the attributes of the target host), such would not be sufficient as the attacker would also be able to detect the lack of other devices that should be present in the target network environment. As a result, the attacker would typically not expose their full set of malicious tactics, techniques, and procedures (TTP) and/or would terminate their attack once the VM environment is detected or suspected. As a result, inadequate and insufficient competitive intelligence (e.g., adversary intelligence against such APT attacks and attackers) can be gained using existing approaches to implementing VM environments for security analysis.

An example APT attack pattern can be initiated by an attacker with a phish directed to a target user/target host, such that an exploit can be identified on the target host, and then a dropper can be used to install malware on the target host that can utilize the exploit to install a rootkit on the target host. At this point, the attacker can use various tools executed on the target host via remote control (e.g., C&C activities, in which the attacker is typically operating a device that is remote from the target host and remote from the target network environment). Such attacks can utilize a variety of phishing attacks and/or malware to attempt to avoid initial detection (e.g., evading firewall based on signatures and/or various other heuristics or other techniques that can be provided by perimeter and/or host-based security approaches). Also, as discussed above, existing, standalone VM environment approaches rarely would be able to observe an entire APT process (e.g., such as the above-described example APT attack pattern) as such are typically only executed in a VM environment for a short period of time (e.g., 1-5 minutes), and anti-VM techniques would often be used by APT attackers to determine that such is a VM environment (e.g., by detecting that the malware/rootkit is not executing on the target host and/or the device is not in the target network but rather in a standalone VM environment, such as a sandbox environment, as also discussed above).

Other existing approaches have attempted to use existing honeypot approaches, such as honeypot projects and commercial attempts that deploy honeypots using a virtual server(s) inside of an enterprise network. These honeypot approaches assume that whoever is knocking at the door is an attacker, which generally catches noisy unskilled, opportunistic attackers that scan the network and attempt to communicate with arbitrary hosts discovered during the scanning process. However, existing honeypot approaches are typically not effective against various advanced threats, such as APT attacks, because as similarly discussed above, skilled adversaries can generally detect when they are in a standalone VM environment (e.g., based on attributes of the VM instance executed in the VM environment) and/or are not in the actual target network environment (e.g., which should typically have other endpoints, such as other hosts including clients and servers, printers, and/or various other devices expected or known by the attacker to be present in the target network environment).

Thus, what are needed are new and improved virtual machine (VM) techniques for advanced security threats.

For example, techniques described herein can be used to provide more effective advanced threat prevention using an instrumented VM environment. In addition, techniques described herein can also facilitate competitive intelligence gathering of such advanced threats or other sophisticated attacker attacks using an instrumented VM environment.

Accordingly, various techniques for synchronizing a honey network configuration to reflect a target network environment are disclosed. In some embodiments, a system for synchronizing a honey network configuration to reflect a target network environment includes a device profile data store that includes a plurality of attributes of each of a plurality of devices in the target network environment; a virtual machine (VM) image library that includes one or more VM images; and a virtual clone manager executed on a processor that instantiates a virtual clone of one or more devices in the target enterprise network using a VM image selected from the VM image library that is customized based on one or more attributes for a target device in the device profile data store. In some embodiments, a method of synchronizing a honey network configuration to reflect a target network environment includes storing a plurality of attributes of each of a plurality of devices in the target network environment in a device profile data store; and instantiating a virtual clone of one or more devices in the target enterprise network using a virtual machine (VM) image selected from a VM image library that is customized based on one or more attributes for a target device in the device profile data store, in which the VM image library stores one or more VM images, and in which the virtual clone is executed on a VM server.

As further described herein, the honey network can be implemented to facilitate intelligent detonation of malware to provide more effective advanced threat prevention using an instrumented VM environment. In addition, these techniques described herein can also facilitate competitive intelligence gathering of such advanced threats or other sophisticated attacker attacks by providing intelligent detonation of malware using the honey network implemented in an instrumented VM environment.

Accordingly, techniques for dynamic selection and generation of detonation location of suspicious content with a honey network are disclosed. In some embodiments, a system for dynamic selection and generation of detonation location of suspicious content with a honey network includes a virtual machine (VM) instance manager that manages a plurality of virtual clones executed in an instrumented VM environment, in which the plurality of virtual clones executed in the instrumented VM environment correspond to the honey network that emulates a plurality of devices in an enterprise network; and an intelligent malware detonator that detonates a malware sample in at least one of the plurality of virtual clones executed in the instrumented VM environment. In some embodiments, a method of dynamic selection and generation of detonation location of suspicious content with a honey network includes managing a plurality of virtual clones executed in an instrumented VM environment, in which the plurality of virtual clones executed in the instrumented VM environment correspond to the honey network that emulates a plurality of devices in an enterprise network; and detonating a malware sample in at least one of the plurality of virtual clones executed in the instrumented VM environment.

As used herein, a honey network generally refers to a virtual emulation of a plurality of devices in communication with a target network. In an example implementation, the honey network can include a virtual clone of one or more of the actual devices to mirror and synchronize various attributes of each of such corresponding actual devices (e.g., such attributes can include IP address, OSs (including version and patch level), application software (including versions and patch level), various configuration settings, and/or various other attributes). For example, a honey network can be generated to emulate a target enterprise network or other computer network that can include a variety of devices, such as servers, appliances, desktop computers, mobile computers including laptops, tablets, smart phones, printers, networking devices including routers, and/or various other devices capable of wireless or wired-based network communications, which can provide various services in communication over the network. In some cases, all or a subset of devices of the target network can be emulated to support high-level interactions, in which a configuration of each of such emulated devices can be implemented to facilitate a virtual clone of such devices, such as further described below. In some cases, a subset of devices of the target network can be emulated to support low-level interactions, in which a configuration of each of such emulated devices can be accurately represented in response to one or more types of probes used by network scanning tools, such as further described below (e.g., Nmap and/or other network scanning tools that send various probes to attempt to determine device type, operating system type and version, and/or various services offered by a device, such as services associated with an open port of the device in communication with the network). In an example implementation, one or more of the emulated devices initially implemented to merely support low-level interactions can be implemented as virtual clones of the corresponding target devices to support high-level interactions by, for example, launching new VM instances in the instrumented VM environment to implement a virtual clone of each of such devices, or vice versa, virtual clones of one or more of the emulated devices can be downgraded to only support low-level interactions (e.g., in which such transitions can be performed on demand, as needed, based on resource availability, and/or based on other criteria).

Techniques described herein can be used to analyze malware (e.g., a malware sample) and/or associated attacker activities in a honey network that can emulate, for example, a target device, such as a target host, in a target network environment that provides for more realistic interactions with a clone of the target device and its relevant target network environment. As a result, this makes it much more difficult for an attacker to detect that the malware is being executed in a virtual sandbox environment instead of on the actual target host in the target network environment. In an example implementation, the cloned target device and, in some cases, a subset of devices in the target network are implemented as VM instances in the honey network to facilitate a high fidelity VM environment that emulates the target host and the subset of devices in the target network (e.g., the devices are implemented as VM instances that can support high-level interactions to facilitate realistic interactions with an attacker and/or malware executed on such VM instances that clone an actual target device, as opposed to only supporting low-level interactions, such as providing (minimal) responses to respond to network scans, such as an Nmap scan). Each cloned device can be implemented as a VM instance that can be configured (e.g., dynamically configured, such as by customizing a base VM image) to clone the respective target device, such as further disclosed herein. In some cases, another device can be added to the honey network on demand to support expected or requested interactions from the cloned target host and/or other devices in the honey network, such as further disclosed herein.

As an example use case scenario, a user, Alice, is an employee of ACME Company and has a device, such as a laptop or other computing device, in which the device is a member of ACME's enterprise network (e.g., is configured to access the ACME enterprise network, that is, Alice's device is in communication with the ACME Company enterprise network, at least for some period of time or periodically). Assume that a malware (e.g., potentially malicious content, such as a download during a web session or an attachment to an email, or a link in a web page, email, and/or file, etc.) is directed to Alice's device. For example, a web session from Alice's computer can be monitored using a data appliance (e.g., that includes a firewall, such as described above) in which a malware URL or malware content is detected using the data appliance (e.g., or other security device). In either case, assume that the malware directed to Alice's host device has been detected. As another example, the data appliance (e.g., or other security device) on the ACME enterprise network detects that an email directed to Alice includes malware (e.g., a malware URL in the content of the email and/or a malware attachment to the email). In either use case scenario, a clone of Alice's targeted host device can be instantiated as a customized VM instance in a VM environment (e.g., instrumented VM environment), along with instances for emulating a subset of devices from the target network environment (e.g., email server, DNS server, printer, etc.) in the VM environment (e.g., using a cloud security service or on a data appliance deployed on the target network environment). In particular, the VM environment can be configured to automatically synchronize with relevant portions of the target network (e.g., network layout, IP addresses, customized host images, etc.) to implement a honey network for the target network. The malware sample (e.g., malware URL, malware file/web download, malware email, and/or malware email attachment, etc.) can be routed to the VM environment and then detonated using the virtual clone of Alice's target host in the VM environment that implements the above-described honey network emulation of (a subset) of the ACME enterprise network. As further described below, various techniques are also disclosed for bridging the target network with the honey network in dynamic and intelligent ways. The behavior of the malware and any subsequent activities on the virtual clone of Alice's target host on the device and/or network interactions with other devices emulated in the honey network implemented in the VM environment and/or, in some cases, external network activities, such as over the Internet and/or with other devices on the actual target network, can also be monitored and logged to gain competitive analysis and to facilitate advanced threat prevention, as further described below.

In particular, techniques described herein can be used to provide improved competitive analysis of various advanced threat attacks (e.g., APT and/or other advanced threat attacks). For example, these techniques can provide insight into the advanced stages for advanced threat attacks that cannot be observed in the short period of time that would typically be allocated for a VM analysis using existing approaches. As such, these techniques can also provide critical threat research and reliable detection for advanced threat attack prevention. For example, collection and analysis of rootkits, end-game tools, and exfiltration techniques can be important to advanced threat research and timely alerting (e.g., advanced threats can then be monitored in real-time by a threat/security analyst).

Also, a new level of targeted threat intelligence can be delivered to customers of a security service that implements these techniques. As an example, in addition to a report that delivers hashes, domains, IPs, network activities (e.g., a network log/report, such as using packet capture (pcap) logging for capturing network traffic) within a single sandbox session, a broader view (e.g., trace) of a compromise at the network level can be included in the report.

Further, such threat intelligence can provide indicators that can be used by a data appliance implementing a firewall or other security device to provide for future prevention of such advance threat attacks. For example, extracting indicators and automatically identifying malware and exploitation can be performed to identify new malware IPs, new malware domains, new malware URLs, new malware network signatures, and/or other indicators that can be used to implement prevention at a firewall or other security device.

Accordingly, various techniques for synchronizing a honey network configuration to reflect a target network environment are disclosed. For example, using such techniques can facilitate an enhanced detection of advanced threats using an instrumented virtual machine (VM) environment. As will be apparent to one skilled in the art in view of the various techniques and embodiments described herein, while the various techniques described herein for synchronizing a honey network configuration to reflect a target network environment are described with respect to VM environments using a security service (e.g., a cloud security service), such techniques can similarly be applied to various other security environments, including, for example, performed in part or completely using security devices such as appliances, gateways, servers, and/or other security platforms capable of implementing various virtual environment techniques disclosed herein.

Overview of an Architecture for Performing a Dynamic Analysis of Advanced Threats FIG. 1 is a diagram of an architecture for performing a dynamic analysis of advanced threats in accordance with some embodiments. For example, such an environment can facilitate performing a dynamic analysis of malware (e.g., a malware sample that may be potential or known malware, in which malware generally refers to various forms of malicious software, links to malicious software, etc., which can be embedded with a file, email, attachment to an email, web page, web download file, linked to a resource that includes the malicious software, and/or using various other delivery and distribution mechanisms). Specifically, the malware can be associated with various types of advanced threats, such as APTs or other advanced threats (e.g., malicious software can include any malicious computer code or executable program, such as active content, executable code, and scripts, that can interfere with operation of a computing device or computer network, attempt unauthorized access of data or components of a computing device, and/or perform various other malicious, unauthorized, and/or undesirable activities). More specifically, a variety of attempts by an unauthorized person (e.g., an attacker) to attempt to deliver malware to an enterprise network 110, which can then be used to target devices on the enterprise network in order to, for example, propagate malware (e.g., malware 130) via system 120 (e.g., any type of computing device) and/or to perform various other unauthorized/undesirable actions are described, as are techniques for performing a dynamic analysis for advanced threats.

In the example shown in FIG. 1, various devices 104-108, shown as a laptop computer 104, a desktop computer 105, a tablet or smart phone 106, a server 107, and a printer 108, are present in enterprise network 110. Data appliance 102 is configured to enforce policies regarding communications between devices, such as client devices 104-106 as well as other devices, such as servers (e.g., server 107) and printers (e.g., printer 108), etc., and nodes outside of enterprise network 110 (e.g., reachable via external network 118, such as the Internet). Examples of such policies include policies (e.g., which can include various rules) for governing traffic shaping, quality of service, and/or routing of traffic. Other examples of policies include security policies such as policies for scanning for threats in incoming and/or outgoing email attachments, website downloads, files exchanged through instant messaging programs, and/or other file transfers and/or intra-networking and inter-networking related data communications. In some embodiments, appliance 102 is also configured to enforce policies with respect to traffic that stays within enterprise network 110 (e.g., intra-networking related data communications).

Appliance 102 can take a variety of forms. For example, appliance 102 can be a dedicated device or set of devices. The components of appliance 102 can also be integrated into or executed as software on a general purpose computer, a computer server, a gateway, and/or a network/routing device. As an example implementation, an architecture for such a data appliance is further described below with respect to FIG. 2.

As will be described in more detail below, appliance 102 can be configured to work in cooperation with one or more virtual machine servers (112, 124) to perform various techniques for performing a dynamic analysis for advanced threats as disclosed herein. As one example, data appliance 102 can be configured to communicate with VM server 112, and VM server 112 can be configured to execute a virtual machine environment for performing a dynamic analysis for advanced threats as further described herein. As another example, appliance 102 can be in (secure) communication with a cloud security service 122, which includes VM server 124, and VM server 124 can be configured to perform a dynamic analysis for advanced threats as further described herein. For example, one or more devices of enterprise network 110 can be emulated in a honey network implemented using the VM environment (e.g., executing one or more VM instances 114 and 116 on VM server 112 and/or executing one or more VM instances 126 and 128 on VM server 124) such that a malware sample directed to a target device in enterprise network 110 can be routed to the VM environment and detonated on a virtual clone of the target device using various techniques disclosed herein.

An example of a virtual machine server is a computing device that can execute virtualization software, such as commercially available server-class hardware (e.g., a multi-core processor such as a dual 6-core Intel® processor with Hyper-Threading, four or more Gigabytes of RAM such as a 128 GB RAM, a system disk such as a 120 GB SSD, and one or more Gigabit network interface adapters). Such a virtual machine server can be configured to execute commercially available virtualization software, such as VMware ESXi, Citrix XenServer, or Microsoft Hyper-V (e.g., such a VM environment can emulate the Windows® XP operating system environment using the dual 6-core Intel® processor with Hyper-Threading and 512 MB of RAM, the Windows® 7 operating system environment using the dual 6-core Intel® processor with Hyper-Threading and 1 GB of RAM, and/or other operating system environments and/or using different hardware capacity/components). The virtual machine servers may be separate from, but in communication with, data appliance 102, as shown in FIG. 1. A virtual machine server may also perform some or all of the functions of data appliance 102, and a separate data appliance 102 is omitted as applicable. Further, a virtual machine server may be under the control of the same entity that administers data appliance 102 (e.g., virtual machine server 112); the virtual machine server may also be provided by a third party (e.g., virtual machine server 124, which can be configured to provide services to appliance 102 via third party service 122). In some embodiments, data appliance 102 is configured to use one or the other of virtual machine servers 112 and 124 for performing a dynamic analysis for advanced threats. In other embodiments, data appliance 102 is configured to use the services of both servers (and/or additional servers not shown). Thus, in some implementations, the cloud security service can be delivered either as a public cloud or as a private cloud (e.g., deployed locally on an enterprise network using a locally deployed data appliance, server, or other computing device that executes the virtual machine (VM) environment).

In some embodiments, the virtual machine server 124 is configured to implement various emulation-based techniques performing a dynamic analysis for advanced threats as described herein with respect to various embodiments (e.g., implemented using instrumented VM environments, which can include one or more VM instances, executed by cloud security service 122 and/or malware analysis system 132, such as further described below with respect to FIGS. 2 through 11, and with respect to various other embodiments disclosed herein). For example, the virtual machine server 124 can provide an instrumented virtual machine environment capable of performing the various techniques as described herein. These instrumented virtual machine (VM) environments, which can include one or more VM instances (126 and 128), can include, for example, various network activity logging, user level hooks, and/or kernel level hooks in the emulated execution environment to facilitate the monitoring of various network and/or program related activities and/or behaviors during emulation using the virtual environment (e.g., instrumented VM environments, such as described above) and to log such monitored activities and/or behaviors for analysis based on the various techniques described herein with respect to various embodiments.

Example Data Appliance Hardware Environment

Figure 2:
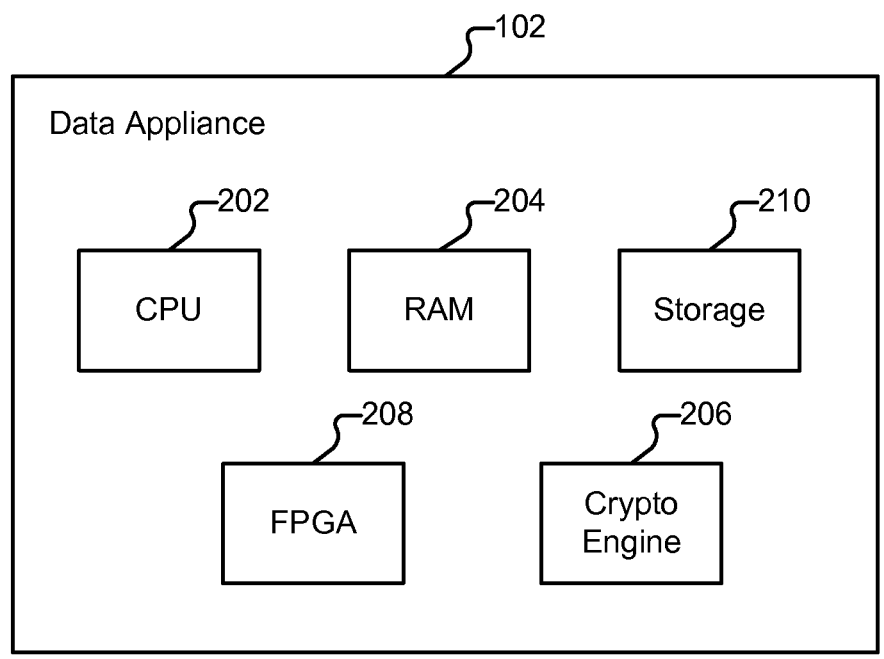
FIG. 2 illustrates a data appliance in accordance with some embodiments.

FIG. 2 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 202 and RAM 204. Data appliance 102 also includes a storage 210 (such as one or more hard disks), which is used to store policy (e.g., layer-3 through layer-7 firewall and/or routing rules, such as destination IP-based routing rules, firewall rules, etc.) and other configuration information. Data appliance 102 can also include one or more optional hardware accelerators. For example, data appliance 102 can include a cryptographic (crypto) engine 206 that can perform encryption and decryption operations, and one or more FPGAs 208 that can perform matching, act as network processors, and/or perform other tasks.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

In one embodiment, data appliance 102 can perform routing of traffic (e.g., based on layer-3 destination IP-based routing rules and/or based on other rules, including layer-3 through layer-7 filtering and routing rules) to route certain traffic to a VM server (e.g., based on a policy implemented by the data appliance, certain traffic directed to a target device that is one of the emulated devices (e.g., as a virtual clone) in a honey network can be routed to the appropriate VM instance executed on a VM server that is implementing the honey network to bridge the target network with the honey network in dynamic and intelligent ways). For example, the VM server can be a local VM server (e.g., VM server 112) or a remote VM server (e.g., VM server 124 of cloud security service 122). In an example implementation, if the VM server is configured as a remote VM server (e.g., VM server 124 of cloud security service 122), then data appliance 102 can provide for secure routing of such traffic communications with another data appliance at cloud security service 122 using a secure protocol (e.g., via a VPN, using Internet Protocol Security (IPsec) or another secure protocol) over Internet 118. These and other techniques for performing a dynamic analysis for advanced threats are further described below with respect to FIG. 3.

Figure 3:
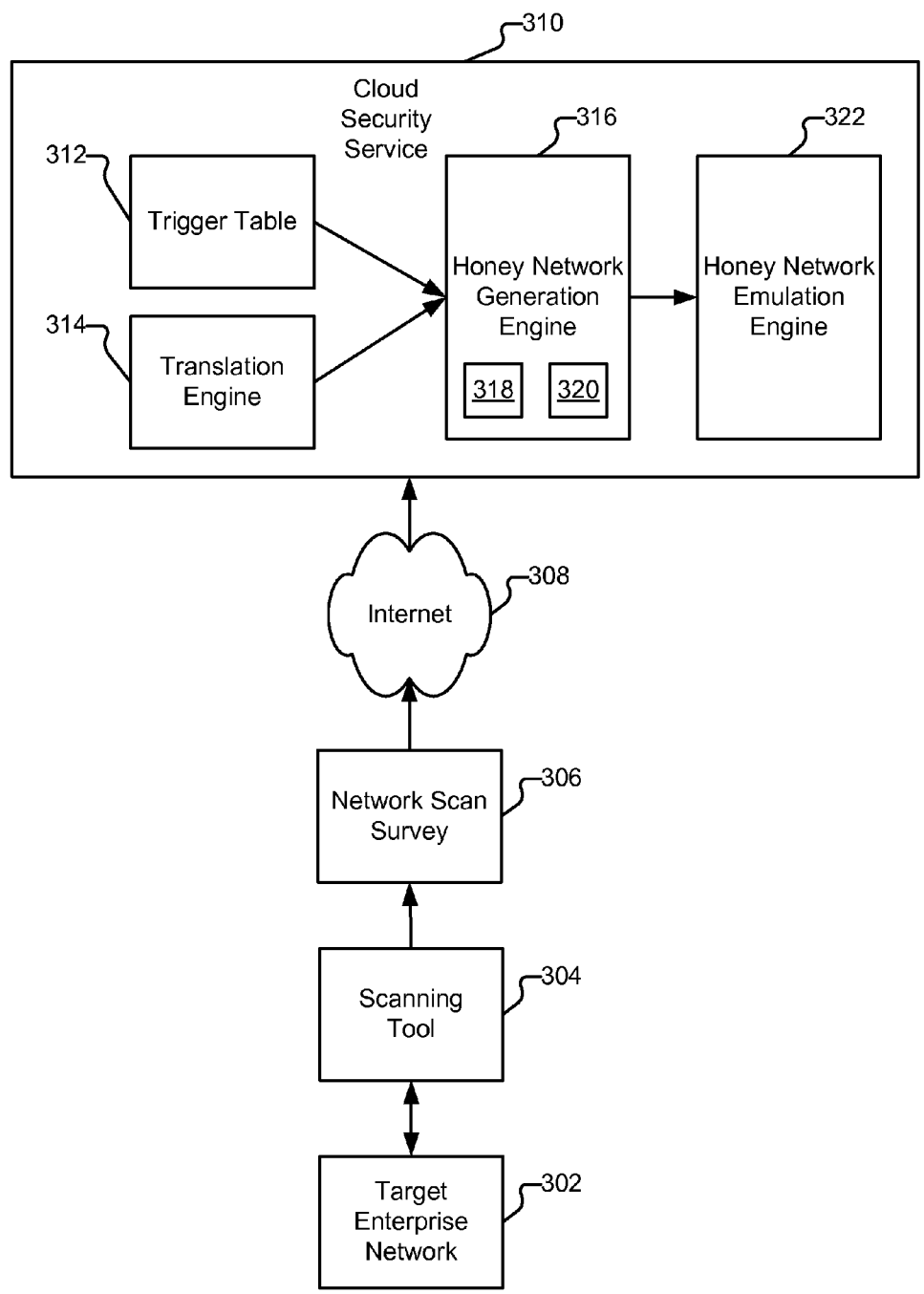
FIG. 3 is a block diagram illustrating techniques for generating a honey network configuration to emulate a target network environment to send responses to network scans that correspond to responses that would be sent by actual devices in accordance with some embodiments.
Figure 4:
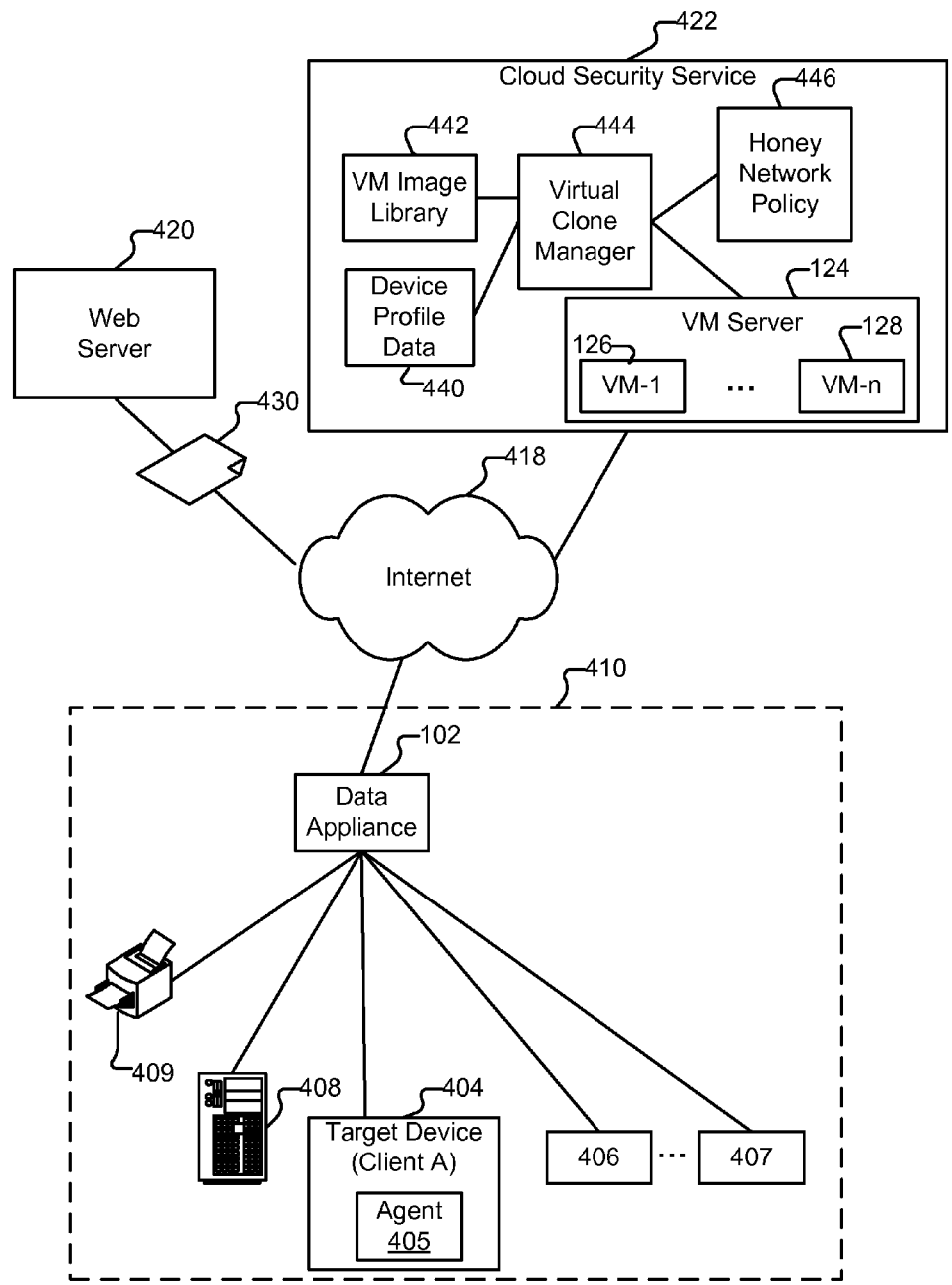
FIG. 4 is a block diagram illustrating techniques for synchronizing a honey network configuration to reflect a target network environment to implement a virtual clone of one or more target devices in accordance with some embodiments.

Techniques for Generating a Honey Network Configuration to Emulate a Target Network Environment to Send Responses to Network Scans that Correspond to Responses that would be Sent by Actual Devices FIG. 3 is a block diagram illustrating techniques for generating a honey network configuration to emulate a target network environment to send responses to network scans that correspond to responses that would be sent by actual devices in accordance with some embodiments. In an example implementation, generation of a honey network configuration to emulate a target network environment (e.g., to send responses to network scans that correspond to responses that would be sent by actual devices to provide a lightweight honey network implementation for one or more emulated devices of the target network) can be performed on an appliance or a computing device that is locally connected to or in local network communication with the target enterprise network (e.g., performed using a device that is also a member of the target enterprise network). In another example implementation, generation of a honey network configuration to emulate a target network environment can be performed using a cloud security service, such as shown in FIG. 4 and further described below.

As shown, a target enterprise network 302 is scanned using scanning tool 304 to generate results of various scanning operations, which is provided in an output result that is generally referred to as a network scan survey 306. For example, a scanning tool, such as Nmap or another commercially available scanning tool (e.g., such as scanning tools available from Metasploit®, Rapid 7, hping, Scapy, and/or other commercially available, open source, and freeware tools) can be used to perform a scan of devices on the target enterprise network to generate the network scan survey. The network scan survey can be provided to a cloud security service 310 (e.g., using a secure communication protocol, such as Internet Protocol Security (IPsec) or another secure protocol) over Internet 308.

As also shown, cloud security service 310 includes a trigger table 312 and a translation engine 314. Translation engine 314 translates network scan survey 306 (e.g., an XML or another format of the network scan survey) into a data representation (e.g., data in a specified format or data structure) that can be processed by honey network generation engine 316. Trigger table 312 represents a set of data that indicates responses to a given scanning tool's probes that are expected to generate a particular result, such as responses that can be used by the scanning tool to identify a device type, an operating system type and version, and/or services provided by the device. In one embodiment, the trigger table is provided for each scanning tool as a commercially available trigger table for the scanning system. In one embodiment, the trigger table is generated by automatically parsing publicly available source code for the scanning system (e.g., parsing one or more triggers that are used to generate each fingerprint for each device, service, and attributes that can be processed and reported based on probes sent and probe responses received by the scanning system, such as Nmap and/or other open source scanning tools, in which the parsing of such Nmap/other scanning tool's source code can be performed for each new version/release of that scanning tool to generate a trigger table for each new version/release of that scanning tool).

Cloud security service 310 also includes honey network generation engine 316 to generate a honey network configuration based on the input received from trigger table 312 and translation engine 314 to emulate target enterprise network 302 (e.g., to facilitate an implementation that can send responses to network scans, such as probe packets, that correspond to responses that would be sent by actual devices). In one embodiment, honey network generation engine 316 automatically generates a systems table 318 and a services table 320. For example, systems table 318 can include entries for each device to be emulated in the honey network. In some cases, an entry for a given emulated device can include an IP address assigned to the emulated device, a device type identification, an operating system (OS) type and version (as applicable or if available from the translated network scan survey). As another example, services table 320 can include entries for each service to be emulated in the honey network. In some cases, an entry for a given emulated service can include an IP address associated with the emulated service, a port number, and a service type identification (as applicable or if available from the translated network scan survey). In one embodiment, honey network generation engine 316 also processes trigger table 312 to include probe responses for each emulated system in the systems table and for each emulated service in the services table with responses to provide to specific probes received from a scanning tool in order to provide responses that would be processed by the scanning tool to properly identify the emulated system and/or emulated service. For example, entries in each table (e.g., the systems table and the services table) can be updated to include such responses to be provided in response to each particular probe. In another embodiment, the appropriate/expected probe responses for each emulated system can be determined at run-time by honey network emulation engine 322 (e.g., during execution in a VM instance when probes are received by the honey network) using trigger table 312 as well as systems table 318 and/or services table 320.

Cloud security service 310 also includes honey network emulation engine 322 to emulate a honey network configuration based on the output received from honey network generation engine 316 to emulate target enterprise network 302 (e.g., to facilitate an implementation that can send network scan responses that correspond to responses that would be sent by actual devices to provide a lightweight honey network implementation for one or more emulated devices of the target network). In one embodiment, honey network emulation engine 322 is executed on a processor as a virtual machine (VM) instance in a virtual machine (VM) environment to emulate devices and/or services of the target enterprise network based on systems table 318 and services table 320. For example, honey network emulation engine 322 can be implemented to respond to a scanning tool's probes using the systems table and the services table (e.g., and, in some implementations, using the trigger table at run-time, such as described above) to provide appropriate responses to each probe from a network scanning tool. In an example implementation, the honey network emulation engine can be executed in a VM environment on a processor, such as a laptop, desktop, appliance, server, or another computing device, such as described above.

For example, the honey network emulation engine can be used to emulate a set of devices and services of a target enterprise network to emulate the virtual existence of such devices and services to provide a realistic view of such devices and services that can be replicated in the honey network. In particular, this approach does not require that these devices and services need to be fully emulated, which would typically require more heavyweight processing requirements in a VM environment. Rather, this approach facilitates a realistic emulation from a perspective of a network scanning tool that may be performed by an attacker or other unauthorized user attempting to identify devices and services on the honey network as further described below. As a result, devices and services in the honey network can appear to an attacker or other unauthorized user, based on a network scan survey (e.g., Nmap scan results or other scanning tool results), to be part of an enterprise's actual network (e.g., to be actual, physical devices and/or actual, active services, etc.). As such, probe responses provided by the honey network emulation engine are generated and sent in order to fool the network scanning tool into determining that an emulated device, IP address, and/or services are present in the honey network (e.g., particular devices with various attributes, IP address, OS type and version, and/or services on certain ports are present based on the probe responses received by the network scanning tool from the honey network emulation engine).

In some cases, this lightweight honey network approach can be used for one or more of the devices in the target network for which there is not, for example, a locally executed agent that can provide more granular attribute information regarding the device (e.g., a printer, router, or other device) (note that various local agent use case scenarios are discussed below with respect to various embodiments described with respect to FIG. 4). In some cases, this lightweight honey network approach can be used for one or more of the devices in the target network for which a virtual clone is not yet configured and/or instantiated (e.g., based on resources, demand, and/or based on various other criteria that can be included in a honey network policy, such as described herein), and, in some use cases as mentioned above, the lightweight emulation of a particular device can be transitioned to using a virtual clone to emulate the target device in the honey network (e.g., or vice versa, that is, a virtual clone emulation of a target device in the honey network can be downgraded to a lightweight emulation of that particular device, such as based on various policies or requirements, such as to reduce computing resource requirements and/or based on a lack of demand for high interactions with that particular device emulated in the honey network).

In one embodiment, the honey network emulation engine responds to various packets that are directed to the honey network (e.g., responding to probes received from Nmap scans and/or other network scanning tools) to provide responses (e.g., to send certain packets and/or to not send any packets) that would be interpreted by such security scan tool(s) to report the emulated device and services representation for each IP address in the honey network. For example, Nmap is a network scanning tool that can report hundreds or possibly thousands of different services, so there are many variations that can exist and be reported based on an Nmap network scan of a given target network. As such, the honey network emulation engine can be configured to be able to generate robust and diverse sets of devices (e.g., using different systems tables and services tables) to provide responses to different Nmap probes to indicate that certain IPs exist and are associated with certain attributes (e.g., system type, OS type and versions, application type and versions, ports and running services, etc.) to facilitate emulation of variations that can exist between different enterprise networks to be emulated in whole or in part as a virtual representation of such target enterprise networks, which is more likely to also not be easily detected as a virtual copy of the target enterprise network by an attacker using various network scans to survey the target enterprise network.

As an example use case scenario, a network admin or security admin of the enterprise network or a third party security provider can perform a network scan (e.g., using a network scanning tool, such as Nmap or other network scanning tools) to scan a portion or all of their enterprise network. The results of the network scan, the network scan survey, can then be imported and processed by the translation engine to facilitate a generation of a honey network configuration to emulate the devices and services identified in the network scan survey. For instance, an Nmap survey (e.g., Nmap scan report of (a portion of) the target enterprise network, which can include desktops, servers, printers, appliances, mobile devices, etc., which can be associated with certain attributes, including open ports and active services, etc.) can be used to generate an automated copy of the scanned network based on that ingested Nmap survey to generate a honey network representation of such scanned devices and services using the techniques described herein.

In an example implementation, the honey network can be configured to replicate the IP addresses of the devices in the target network. Using this approach, if a attacker's activities are routed from a target device in a target enterprise network to a virtual clone of the target device implemented in a honey network in a VM environment, and if the attacker then attempts to probe the surrounding network using a network scanning tool (e.g., Nmap), the honey network implementation would be able to provide appropriate/expected responses to such probes even for other devices in the honey network that are not (yet) instantiated as virtual clones but which are emulated using the above-described lightweight honey network techniques. This approach can avoid easy detection by the attacker of the VM environment as the network scan results received by the attacker's network scanning tool operations would indicate the existence of devices and their associated IP addresses (e.g., as well as other attributes that can be identified using such network scanning tools) that match results that the attacker may have previously collected while performing similar scanning operations when on the actual target device in the actual target network environment.

In another example implementation, the honey network can emulate the devices and services identified in the network scan survey of the target enterprise network using different assigned IP addresses to be associated with the emulated devices and services. As an example, such different IP addresses can be IP addresses selected from an additional subnet IP address space of the enterprise target network. This approach of using different IP addresses can avoid potential conflicts with IP addresses of existing, real systems and services of the target enterprise network (e.g., to avoid confusion or errors that could arise if legitimate users or services attempted to communicate with such virtual devices and virtual services in the IP subnet associated with the honey network). As a result, if an attacker identifies the existence of the subnet of IP addresses that are actually associated with the honey network, then the attacker would potentially attempt to scan one or more IP addresses that are actually associated with the emulated honey network. This allows for such illegitimate attacker probing and other activities in the honey network to be logged and monitored, such as by the cloud security service. As discussed above, the emulated honey network is configured to respond to any such illegitimate attacker probing by providing expected responses that would make it very difficult for the attacker to be able to distinguish the emulated honey network from the actual physical network of the target enterprise network (e.g., as the only differences that would be evident based on network scans would just be different IP addresses associated with the virtual and the physical devices and services).

In another example implementation, the honey network can be configured to replicate the IP addresses of one or more of the devices in the target network (e.g., in addition to the virtual clones of one or more target devices that can be associated with the same IP addresses in the emulated honey network as their corresponding actual devices in the actual target network) and can also be configured to emulate one or more of the devices and services identified in the network scan survey of the target enterprise network using different assigned IP addresses to be associated with the emulated devices and services. The hybrid IP address mapping approach can provide for a more diverse honey network environment that can replicate IP addresses, for example, for a subset of devices to which one or more virtual cloned target devices had recent communications with or are configured to communicate with (e.g., a target device's configured network printer(s), email server, DNS server, proxy server, and/or other devices that an attacker is more likely to expect, to probe, and/or to be able to detect a different IP address assignment as a discrepancy that may be inferred as a VM environment indicator to the attacker), but for other devices in the enterprise network, the actual IP addresses are not replicated to minimize the risks of using the same IP addresses when such may be unnecessary, such as discussed above (e.g., and the attacker may be less likely to notice any such IP discrepancy to such other devices).

In one embodiment, an Nmap survey (e.g., an XML formatted document that is generally intended for human readable consumption) is translated by the translation engine to be in a data representation that can be processed by the honey network generation engine (e.g., using a script(s) and/or a computer program(s) executed on a processor to parse and process the Nmap survey in order to translate the Nmap survey into another data representation that can be processed by the honey network generation engine). In an example implementation, the translation engine can also map each actual IP address value of each device detected in the Nmap survey results of the target enterprise network to a target IP address in the IP address space associated with the honey network. In some cases, for each device with an actual $IP_x$ value in the target enterprise network based on the Nmap survey, results can be mapped to a new target $IP_y$ value with the same associated attributes (e.g., device type, OS type and version, application type and version, open port numbers, services on such open ports, etc.) to include in the honey network to be generated.

In one embodiment, a services table is generated by the honey network generation engine. In an example implementation, a key for each service can be generated using the assigned new target IP address value (e.g., $IP_y$) and using the port number (e.g., the port number associated with a given service, such as Apache version 2 (v2) or another service, in which the port number is extracted from the Nmap survey results). As a result, the key is uniquely associated with the emulated service in the services table (e.g., based on its assigned IP address and port number), which also facilitates efficient lookup operations for the emulated service using the services table.

In one embodiment, a systems table is generated by the honey network generation engine. As an example, the systems table can be generated using an array for each target IP address value (e.g., $IP_y$) for the emulated system. In some cases, the array for $IP_y$ can be initialized with certain default values that can subsequently be updated based on the trigger table (e.g., a default TTL, ARP response, ICMP ECHO can be initialized with zeroes if Nmap survey results do not provide data for such values). If certain values for some of these attributes are present from the parsed Nmap survey results, then such values can be populated accordingly in the systems table by the honey network generation engine.

In one embodiment, the honey network generation engine is implemented as a single lightweight process, in which these engines and modules can be implemented using executable programs (e.g., using Python code, Java code, and/or other programming languages). In an example implementation, the honey network generation engine can be executed using commercially available personal computing (PC) hardware and/or using more powerful hardware, such as described above.

Whenever cloud security service 310 is described as performing a task, a single component, a subset of components, or all components of cloud security service 310 may cooperate to perform the task. Similarly, whenever a component of cloud security service 310 is described as performing a task, a subcomponent may perform the task and/or the component may perform the task in conjunction with other components. In various embodiments, additional logical components/features can be added to cloud security service 310 as applicable.

As described above with respect to FIG. 3, a network scan survey (e.g., an Nmap survey or other network scanning tool's survey) can be used as input to generate a honey network configuration to emulate a subset of or an entire target enterprise network. The honey network can be emulated using a honey network VM instance executed in a virtual environment that is configured to respond to network scan probes (e.g., from an attacker or other unauthorized network scanning activity) in order to emulate the target enterprise network using the honey network configuration. In some embodiments, one or more of the target devices can be cloned to generate a virtual clone of such target devices in the honey network, in which such virtual clones are implemented to provide a high-fidelity (e.g., high interaction) VM instance of such target devices, as further described below with respect to FIG. 4.

Figure 6:
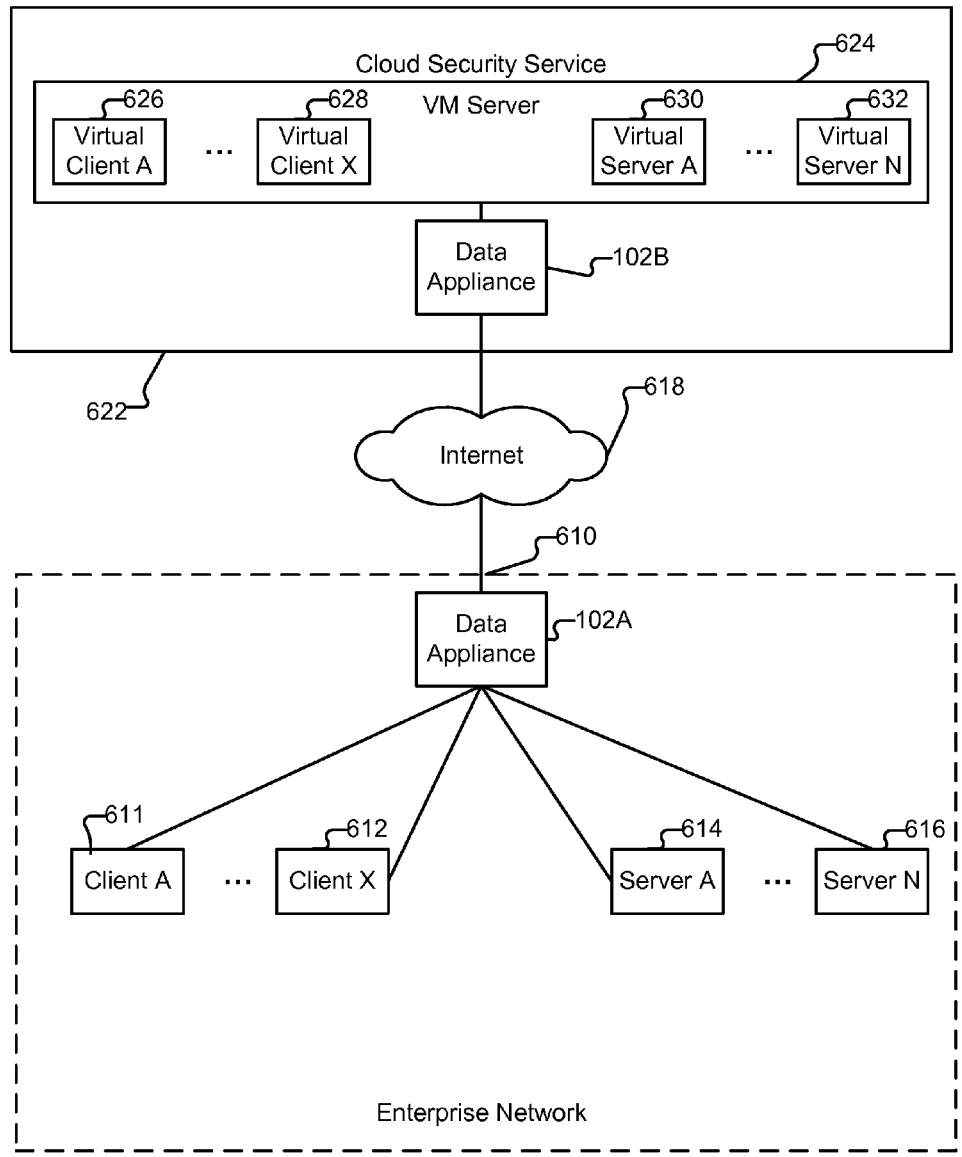
FIG. 6 is a block diagram illustrating an example honey network with a synchronized configuration to reflect a target network environment to implement virtual clones of selected devices of the target network in accordance with some embodiments.

Techniques for Synchronizing a Honey Network Configuration to Reflect a Target Network Environment to Implement a Clone of One or More Target Devices FIG. 4 is a block diagram illustrating techniques for synchronizing a honey network configuration to reflect a target network environment to implement a virtual clone of one or more target devices in accordance with some embodiments. For example, a high-fidelity cloned environment can be generated to emulate one or more devices in the target network environment using techniques described below. In an example implementation, synchronizing a honey network configuration to reflect a target network environment to implement a virtual clone of one or more target devices can be performed on an appliance or a computing device that is locally connected to or in local network communication with the target enterprise network (e.g., performed using a device that is also a member of the target enterprise network). In another example implementation, synchronizing a honey network configuration to reflect a target network environment to implement a virtual clone of one or more target devices can be performed using a cloud security service, such as shown in FIG. 6 and further described below with respect to FIG. 4.

As shown, a target enterprise network 410 includes a data appliance 102 and various other devices, which can include various clients or host devices, such as target device 404, and/or various other devices shown as 406-407 (e.g., network devices, printers, clients, servers, etc.). Target device 404 includes an agent 405 that executes on target device 404 to collect various device profile data, such as further described below. Agent 405 can communicate various device profile data to data appliance 102 (e.g., upon request, periodically, based on an event, or using various other push and/or pull communications that can be triggered based on various events, such as described below). Other devices (e.g., clients 406-407 and/or other devices in the enterprise network, such as server 408 and printer 409) can also execute an agent that can similarly collect various device profile data and similarly communicate such device profile data to data appliance 102. Data appliance 102 can store such device profile data locally (e.g., in a management plane, such as described below with respect to FIG. 5) or using an external data store. As described below, data appliance 102 can send device profile data (e.g., for one or more devices) to a cloud security service 422 (e.g., using a secure communication protocol, such as Internet Protocol Security (IPsec) or another secure protocol) over Internet 418 (e.g., such communications can be performed upon request, periodically, based on an event, or using various other push and/or pull communications that can be triggered based on various events, such as described below).

As also shown, cloud security service 422 includes a device profile data store 440 (e.g., device profile data can be stored in memory of a server or using an external data store). For example, the device profile data can be stored using an XML format or another structured data format. Cloud security service 422 also includes a VM image library 442. For example, the VM image library can include one or more (base) VM images that can be customized to instantiate VM clones of one or more devices of the target enterprise network, such as further described below. For example, a network administrator (admin) or security admin for the enterprise network can upload a set of VMs to include in the VM library (e.g., to provide VM images that cover commonly used or support client environments for clients in their enterprise network) and/or the cloud security service provider can similarly provide a set of VMs to include in the VM library. By maintaining a library of VM images, new VM instances can be more efficiently instantiated to clone target devices based on device profile data, such as further described below. Cloud security service 422 also includes a virtual clone manager 444. In an example implementation, a virtual clone of one or more target devices, such as target device 404, can be implemented by the virtual clone manager selecting an appropriate VM image from the VM library (e.g., a Microsoft Windows® 7 base image, with Microsoft Office® 2013, and Adobe Acrobat® 9 installed), and automatically customizing that base image based on the device profile data stored in device profile data 440 for target device 404 to provide a virtual clone of that target device. The customized VM image can be instantiated on a VM server 124 as a new VM instance, such as VM-1 126 or VM-n 128.

In some cases, the above-described lightweight honey network approach can be used for one or more of the devices in the target network for which there is not a locally executed agent that can provide more granular attribute information regarding the device (e.g., a printer, router, or other device). In some cases, the above-described lightweight honey network approach can be used for one or more of the devices in the target network for which a virtual clone is not yet configured and/or instantiated (e.g., based on resources, demand, and/or based on various other criteria that can be included in a honey network policy, such as described herein), and, in some use cases as mentioned above, the lightweight emulation of a particular device can be transitioned to using a virtual clone to emulate the target device in the honey network (e.g., or vice versa, a virtual clone can be denigrated to a lightweight emulation as discussed above). In one embodiment, virtual clone manager 444 can generate a new virtual clone or shut down a virtual clone of the honey network and/or generate a lightweight honey network emulation of one or more devices based on a honey network policy 446. For example, honey network policy 446 can be configured for each cloud security service customer to include one or more rules for implementing a honey network (e.g., when to instantiate new virtual clones and/or to spin down previously instantiated virtual clones based on resources, demand, and/or based on various other criteria that can be included in a honey network policy, such as described herein).

In one embodiment, the honey network is deployed in a public cloud, such as shown in FIG. 4. In another embodiment, the honey network is deployed in a private cloud, which can be similarly implemented using a VM server within the enterprise network, such as shown in FIG. 1.

In one embodiment, the honey network is deployed using VM instances executed on a VM server (e.g., in which virtual clones of target devices can be executed on the VM server, such as described herein with respect to FIG. 4). In one embodiment, the honey network is deployed to also include a high-interaction honeypot that is configured to capture extensive information on threats, in which the honeypot is implemented using real systems, applications, and services for attackers to interact with, such as various printers, servers (e.g., email servers, web servers, LDAP servers, file share servers, etc.), clients, and/or other devices.

The honey network techniques disclosed herein facilitate providing a virtual clone of a target device that can be used to detonate malware in the virtual clone. For example, the virtual clone can be configured to synchronize the installed software (including versions thereof) and various configuration settings of the target device. As such, this can provide for a better sandbox environment for testing malware, because malware can be targeted to certain exploits, which are generally associated with certain software, including versions of the software and/or patch levels (e.g., Microsoft Windows® XP, Service Pack 2, Adobe Acrobat® Version 7, etc.). Also, an attacker may detect that the malware has been redirected to a sandbox environment if certain configuration related settings have changed (e.g., do not match previous settings detected on the actual target device), such as location with the network, IP address, proxy settings, logged in user, and/or various other settings. As disclosed herein, the device profile of the target device(s) of the enterprise network can be determined using network data and/or an endpoint presence (e.g., an agent executed locally on the device) to detect the environment of the target hosts in order to synchronize or "clone" relevant aspects of the device and network to provide for a honey network that more accurately and more realistically reflects the target device(s) and the target network environment.

In one embodiment, an agent is deployed to devices (e.g., endpoints) on the enterprise network. For example, commercially available agent software can be used to collect device profile data, such as the Global Protect agent from Palo Alto Networks, Inc. and/or other commercially available or open source/freeware agents can be used to collect device profile data. The agent can be configured to automatically collect data from the device, which is referred to herein as device profile data. For example, device profile data can include installed software and versions, and various configuration data (e.g., Operating System (OS) configuration settings, such as logged in user, browser proxy settings, network settings, and/or various other OS, device, and/or network related settings). The device profile data of a target device (e.g., in which malware was determined to be directed to the target device) can be used to synchronize with the honey network implementation such that the device profile data can be used, for example, to deploy a decoy host (e.g., a virtual clone) that can be used for detonating malware that was directed to the target host (e.g., the virtual clone can be implemented using a VM image customized based on the device profile data and instantiated in an instrumented VM environment as described herein). In an example implementation, device profile data (e.g., Host Information Profile (HIP) data) received from the agent (e.g., Global Protect (GP) agent or another agent) can be used to automatically select a host VM configuration from a VM library (e.g., selecting a VM image that most closely matches the installed OS/version, installed application software/version, and/or other HIP data of the target device) to provision a new VM instance to clone the target device based on the HIP data (e.g., further customization may also be performed to configure the VM instance to match relevant HIP data and/or other configuration or network related values/settings). As such, the decoy host can be configured to execute the same version of OS and same versions of application software as the target host. In addition, the decoy host can be configured with the correct configuration settings to match such configuration settings/state of the target device (e.g., how long the device has been live/up and running, IP address, proxy settings, default printer, LDAP server, default DNS server, and/or configuration settings/state of the target device).

In one embodiment, data appliance 102 is configured to collect network data to identify devices (e.g., using a network sensor to identify and detect high profile devices/hosts, default printer, LDAP server, default DNS server, etc.) reachable from the target device. For example, the high profile devices/hosts in communication with the target device (e.g., default printer, LDAP server, default DNS server, and/or other devices) can be similarly synchronized (e.g., replicating the service(s) and IP addresses, and/or other aspects of such other devices) to implement virtual clones of such other hosts in the honey network environment to more accurately and more realistically represents the target device(s) and the target network environment. For example, if a target device 404 is in communication with a server 408, such as an Active Directory (AD) server or a file share server, or a printer 409, then the server or printer can be implemented using a virtual clone that is configured with the same IP address as each corresponding actual device in the target enterprise network.

In another embodiment, a template network is used as a default to emulate in the honey network (e.g., if such network sensed data is not available or to more efficiently implement a virtual network environment in the honey network). For example, a template network can be initially instantiated in the honey network along with a virtual clone of a target device, and other devices can be implemented as virtual clones in the honey network based on demand and/or other criteria (e.g., if a request from the virtual clone is directed to a different device of the enterprise network, then that device can be cloned in the honey network, using device profile data and/or network sensed data).

In one embodiment, automatic mirroring and synchronization of the honey network configuration to reflect the target network environment is performed using the User-ID for user identification available from data appliance 102. As discussed above, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). For example, the User-ID feature can be applied to provide a mapping of domain user names to IP addresses (e.g., User-ID data). This User-ID data can be used to automatically configure IP addresses for each user's device(s) reflected (e.g., cloned) in the honey network to keep such actual IP addresses in the target network synchronized with the corresponding virtual clones of such devices in the honey network (e.g., such IP addresses can change over time, due to dynamically assigned IP addresses, a newly added device, and/or other IP address related configuration changes in the target network).

In one embodiment, agents are deployed on devices on enterprise network 410. The agents execute locally on each device to detect what software and versions are installed on the device, various configuration settings, and/or other aspects (e.g., time since last boot up, logged on user, and/or various other aspects). In an example implementation, when a device is connected to the enterprise network (e.g., a newly added device, or a device that connects wirelessly via DHCP, etc.), the data appliance can be configured to automatically push an agent to the device. The data collected by the agent is generally referred to herein as device profile data. The agent can also be configured to automatically communicate the device profile data to the data appliance. In an example implementation, the data appliance can locally store the device profile data (e.g., in a data management plane of the data appliance, such as described below with respect to FIG. 5). In another example implementation, the data appliance can store the device profile data in an external data store. These agents can be configured to perform such activities periodically, upon demand/request (e.g., a request communicated from the data appliance), and/or based on an event (e.g., a reboot, a new IP address assignment, a logon, and/or other events). The data appliance can provide the device profile data for one or more of the devices to cloud security service 422, which can store the device profile data in device profile data store 440 (e.g., the device profile data can be stored in a memory of a server for faster performance, and/or in an external data store implemented by the cloud security service). As described herein, the device profile data can be consumed to implement virtual clones of target devices in enterprise network 410 to implement a honey network that more precisely emulates such devices in the honey network with greater fidelity (e.g., as compared to, for example, the low fidelity approach described above with respect to FIG. 3).

In one embodiment, active probing techniques can also be applied to perform device and service discovery on the enterprise network environment, such as using various commercially available and/or freeware/open source discovery/scanning tools, such as Nmap or other tools discussed above. Such a tool can be executed (e.g., on the data appliance or another device in the enterprise network environment or the cloud security service) to generate a network scan survey. For example, the network scan survey data can be used in addition to the agent-based device profile data, in which the network scan survey data can be used to supplement the device profile data that may not be obtained for all devices in the enterprise network (e.g., some devices may not have an agent installed for providing the device profile data, such as for devices that an agent is not available for the type of device and/or OS platform, such as certain printers, network devices, and/or other devices). As such, the network scan survey data can be used to generate low interaction support for such devices represented in the honey network as similarly discussed above with respect to FIG. 3.

In one embodiment, the device profile data includes user name information and IP addresses associated with each device. For example, User-ID data maintained by the data appliance can be used to harvest domain users and IP mappings, which can be implemented in the honey network representative of such devices to produce a realistic device IP environment in the honey network to auto-configure IP addresses and to keep such IP and user information synchronized with the target network environment (e.g., in which such information can change over time).

Intelligent Detonation of Malware Downloaded Via the Web in a Virtual Clone of the Target Device in the Honey Network As an example use case scenario, the honey network can be used to intelligently detonate malware sent to a target device (e.g., a client/host or another device) from another source, such as malware downloaded from a web server. As another example use case scenario, the honey network can be used to intelligently detonate malware sent to a target device via electronic mail ("email"). Each of these use case scenarios will be further described below.

In an example use case scenario, assume that the honey network has been configured to clone a subnet of a target enterprise network (e.g., 10.0.01.0/24). As discussed above, a network scan (e.g., Nmap scan) can be performed on the subnet of the target enterprise network to generate a network scan survey. As also discussed above, the network scan survey data can then be processed to implement a low-interaction emulation of that subnet of the target enterprise network as a honey network (e.g., the honey network can be implemented as a private or public cloud as discussed above). In this example, the honey network can be allocated a separate IP space (e.g., 10.0.02.0/24). As such, no legitimate users/services should be attempting to scan or otherwise access the honey network. In this example, this honey network implementation just supports low interactions, as virtual clones have not yet been instantiated to emulate any of the target devices in the enterprise network.

A virtual clone can be instantiated for one or more of the target devices in the enterprise network to support high interactions for such target devices in the honey network. For example, a virtual clone can be instantiated for a target device based on various policies or criteria, such as to facilitate an intelligent detonation of malware that was destined to be sent to the target device (e.g., the data appliance can detect malware being sent to the target device). As discussed above, agents can also be deployed on each of the devices and/or a subset of the devices (e.g., any or a subset of devices for which a compatible agent is available). In this example, assuming that device profile data is available for the target device, a virtual clone can be instantiated as a new VM instance on the VM server to implement a high-interaction emulation of the target device in the honey network, as similarly described above. For instance, if the device profile data indicates that the target device is a device executing Microsoft Windows® XP with Service Pack 3 (SP3), Microsoft Internet Explorer® Version 7, and Adobe Acrobat® Version 8, then an appropriate VM image from a VM library can be selected and/or a base VM image can be customized to instantiate and execute a VM instance with the same executing software environment. In addition, various other configurations and/or settings can also be configured in the VM image to emulate the current target device operating environment (e.g., logged on user, IP address, time since last reboot, default printer, configured DNS server, configured email server, etc.). In an example implementation, a cloud security service can be configured to process the device profile data of any target devices to be virtually cloned and also process the network scan survey data to implement a virtual emulation of that subnet of the target enterprise network as a honey network executed as VM instances on a VM server in an instrumented VM environment provided by the cloud security service (e.g., the honey network can be implemented as a private or public cloud as discussed above). As such, one or more target devices are virtually cloned in the honey network to support high interaction in the honey network and other devices in the subnet of the target network environment are supported for low interactions in the honey network. As further discussed below, a malware sample detected as destined for one of these target devices can then be intelligently detonated using that virtual clone in the honey network.

Referring to the malware download from the web use case scenario, a host/target device can be cloned to execute a virtual clone (e.g., in which a clone host can be implemented as a VM instance configured to match device profile data for the target device) to facilitate intelligent detonation of a malware sample using the cloned host executed in a VM environment (e.g., an instrumented VM environment). Assume that a Client A (e.g., a device in an enterprise network that is a "victim" or target of the malware) is executing the following software: Microsoft Windows® XP SP3, Oracle Java® 1.07, Adobe Reader® 9.3, Microsoft Office® 2013, and/or various other software. In this example, Client A is also executing an agent, such as a Palo Alto Networks Global Protect (GP) agent, a Cyvera agent, and/or another commercially available/open source/freeware agent that is configured to collect and report device profile data such as described herein (e.g., in some cases, a device can be configured to execute one or more of these agents and device profile data that is collected can be merged and/or selected based on various criteria and/or policies). In an example implementation, the agent can provide a snapshot of such installed software, configuration, and settings associated with Client A at a given time interval to detect one or more of the following attributes of the client, such as device/OS configuration and settings, installed OS and version, installed applications and versions, and/or any other relevant host and network artifacts (e.g., logged in user name, configured domain controller, DNS, assigned IP address, browser proxy settings, configured local time zone, installed OS/application language packs (such as English, Japanese, Chinese, and/or other language packs installed on the OS platform), time since last reboot, network session logs, and/or other attributes of the client/device). The agent snapshotting operation can be performed periodically, in response to a snapshot request/on demand, and/or in response to an event (e.g., a determination that malware destined for Client A is detected by a data appliance, and, as a result, Client A is selected to be cloned in a honey network executed in a VM environment). The agent executed on Client A can send these collected host attributes (e.g., device profile data, which includes various high-fidelity host information, including Host Information Profile (HIP) data in some cases) to a data appliance and/or to a cloud security service on demand, periodically, or based in response to an event (e.g., malware destined for Client A is detected). In some cases, this data can be sent from the agent to the data appliance and/or via the data appliance to the cloud security service as a message (e.g., a heartbeat message).

Referring to FIG. 4, during a web session, if malware 430 is detected as being sent to target device 404 (e.g., in this example, assume that this target device corresponds to Client A at IP address 10.0.0.1), then data appliance 102 can detect such malware (e.g., using application-based firewall techniques for scanning malware during a web session, such as described above with respect to advanced or next generation firewalls). At this point, based on a policy, data appliance 102 can select target device 404 (e.g., Client A) for performing intelligent malware detonation in a honey network (e.g., which can also be determined based on a honey network policy that can also be similarly implemented using data appliance 102, such as described above with respect to FIG. 4). Data appliance 102 can then send device profile data for target device 404 (e.g., Client A) to cloud security service 422 for instantiating a VM instance that clones target device 404 (e.g., Client A). In an example implementation, data appliance 102 can be configured to send current device profile data for target device 404 (e.g., Client A), along with current session data associated with that web session for target device 404 (e.g., Client A), and such data can be sent (e.g., in a package) along with the malware (430) to the cloud security service 422. As similarly described above, cloud security service 422 can then instantiate a virtual clone to execute a cloned version of target device 404 (e.g., Client A) in the VM environment provided by the cloud security service.

As shown in FIG. 4, cloud security service 422 provides a VM environment implemented using VM server 124. Cloud security service 422 also includes a VM library that can include a plurality of VM images (e.g., a library of different VM images, such as Microsoft Windows® XP, Microsoft Windows® 7, Microsoft Windows® 8, etc.) to support a variety of different clients that are common or present in a customer's enterprise network, such as enterprise network 410. For example, if the target device (e.g., Client A) is executing Microsoft Windows® XP SP3, then a VM image for Microsoft Windows XP® can be loaded and booted in the VM environment, and other attributes can be implemented by patching the base image of this VM instance (e.g., dynamically such that it can be patched on-the-fly, such as in a number of seconds when performed in memory on the VM server, such as the server described above). For example, the base image of this VM instance can patch the Microsoft Windows® XP OS with the Service Pack 3 (SP3) patch and can also be configured with Oracle Java® 1.07, Adobe Reader® 9.3, and MS Office® 2013 to customize the preconfigured Microsoft Windows® XP OS environment to clone the target device (e.g., Client A) environment, including any other relevant device profile data that was included in the agent snapshot provided to the cloud security service for implementing a high-fidelity cloned environment for that target device—Client A (e.g., any other useful host and network artifacts, such as described above, including, for example, various other installed application software, device/OS configuration settings and other settings, and/or other attributes). In some cases, the customizing of the VM image can include patching the last reboot time based on the value for that attribute received in the most recent snapshot for the target device—Client A and any other relevant host and/or network artifacts, such as logged in user name, configured domain controller, DNS, IP, browser proxy settings, local time zone, installed OS/application language packs, and/or network session logs. In another example, a plurality of different VM environments can be preconfigured and mounted to clone a significant number of target host devices (e.g., to reflect various supported and/or common host device environments present in the enterprise network). A variety of approaches can be used to efficiently execute a VM instance that clones the target host in a VM environment using the techniques described herein.

At this point, the virtual clone of the target device (e.g., Client A) is executing in the VM environment. The malware (e.g., potential, suspicious, and/or known malware) has also been provided to the cloud security service. The malware can then be detonated in the virtual clone (e.g., customized VM instance, such as VM-1 126 executed on VM server 124) to provide for intelligent detonation of the malware sample using the cloned host and its relevant target network environment in the VM environment (e.g., one or more other devices of the target network environment can also be cloned using other VM instances, and/or one or more other devices can be supported for low-interaction support, such as the devices in the relevant subnet of the target device—Client A, such as using the techniques described above with respect to FIG. 3, which can be implemented using another VM instance, such as VM-n 128 executed on VM server 124).

In one embodiment, an agent executed on the target device—Client A can also collect local configuration and/or network log data that can also be used to provide information identifying a relevant surrounding network environment of the target device—Client A. For example, such information can include recent network connections from Client A to other devices on the target enterprise network and protocols that were used for such network communications (e.g., based on collected active sessions data for Client A, it can be determined that Client A communicated via local network file share/server, local network printer, AD server, DNS server, etc.). For example, VM instances can be launched on demand in the VM environment for each of these other relevant devices to clone such devices in the network environment of Client A in the VM environment (e.g., another client/host device, IP address and domain of AD server, DNS, file share, printer, etc.) to facilitate a more accurate and realistic honey network that would be even more difficult for an attacker or unauthorized user to detect as being a sandbox/VM environment as opposed to the actual target network environment. As similarly described above, the VM library can be used to efficiently instantiate clones of such other devices in the target network based on the device profile data (e.g., IP address and domain data associated with AD, DNS, file share, and printer can be included in such collected data).

As an example, if a new session from cloned Client A, such as a virtual clone of target device—Client A 404, in the VM environment indicates a new print session (e.g., TCP SYN directed to IP address of a printer, such as corresponding to printer 409), then a cloned printer VM instance can be instantiated dynamically in the VM environment (e.g., using virtual clone manager 444 and VM image library 442, such as similarly described above) to handle (e.g., with high fidelity) such a network session, such that a VM instance of such emulated device (e.g., printer) can respond appropriately to the TCP SYN packet and/or other interactions between the virtual clone of Client A and the virtual clone of the printer in the honey network executed in the VM environment. In an example implementation, the VM library can include a variety of different VM images for such target devices that can be efficiently loaded on demand in the VM environment by the VM clone manager to implement high-fidelity VM instances that can appropriately respond to such protocols and session traffic for that type of device in the honey network to emulate a relevant subset of devices in the target network environment to facilitate a honey network that more accurately and more realistically reflects the target network. An advanced attacker (e.g., an unauthorized user attempting an APT attack) may similarly attempt to detect whether or not their malware is being executing in a VM environment by, for example, attempting to determine whether the expected surrounding network environment is present, such as by checking to see if the expected local file share, local network printer, local AD, local DNS, and/or other clients/hosts are present and respond to interactions as expected. Thus, by implementing virtual clones of one or more of the devices (e.g., as described with respect to FIG. 4) and/or at least providing lightweight emulations of one or more of the devices (e.g., as described with respect to FIG. 3) in the surrounding network environment of the target device—Client A in the honey network executed in the VM environment, a more robust honey network for the relevant target network environment is provided for the target device—Client A to facilitate a more intelligent detonation of the malware and to allow for more effective intelligence gathering and monitoring of advanced threats and activities by attackers perpetrating such advanced threat attacks directed towards the target network environment.

While the above-described embodiment discusses a use case scenario for the cloud security service for an example enterprise network environment of a customer of the cloud security service, it should be apparent to those of ordinary skill in the art that the cloud security service can similarly support multiple different target enterprise networks for different customers. In an example implementation, the honey network configurations and executions can be performed on one or more VM servers. In some cases, if two different customers are supported using a single VM server, then the data and VM environments of the two different customers can be securely partitioned to secure and partition any data between such customers. In other cases, each customer can be allocated a separate VM server for implementation of the VM environments for each customer. As also discussed above, in some cases, the VM environment for a given customer can be provided using a VM environment executed on a VM server that is locally deployed on the customer's enterprise network to avoid any data leaving the customer's enterprise network to implement the honey network techniques disclosed herein. Various other combinations or approaches to deploying and partitioning the VM environment for implementing these disclosed honey network techniques can be provided as would now be apparent to one of ordinary skill in the art in view of the various embodiments disclosed herein.

Example Data Appliance Logical Architecture

Figure 5:
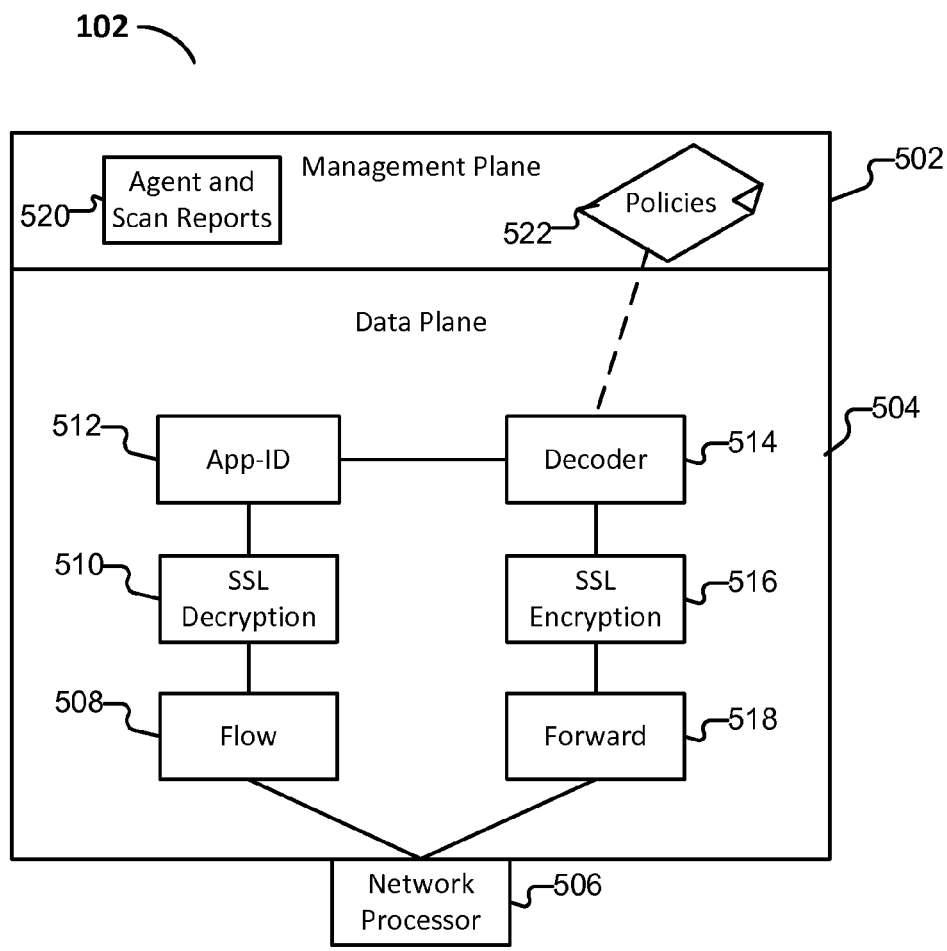
FIG. 5 is a block diagram illustrating an example logical architecture of a data appliance for providing a honey network in accordance with some embodiments.

FIG. 5 is a block diagram illustrating an example logical architecture of a data appliance for providing a honey network in accordance with some embodiments. As discussed above with respect to FIG. 4, devices can be located and operating within an enterprise secured network environment 410. Devices accessing other devices within the enterprise network and/or accessing the Internet 418 and various web sites or web services (e.g., Microsoft Office Online®, SalesForce.com®, Apps.gov, Google® search and/or services, Facebook®, Skype®, and various other online resources) available via the Internet do so through the security infrastructure of the enterprise security network, such as through the enterprise firewall/security appliance shown as a data appliance 102.

Referring to FIG. 5, the example shown is a representation of logical components that can be included in data appliance 102. As shown, data appliance 102 includes a management plane 502 and a data plane 504. In one embodiment, the management plane is generally responsible for managing user interactions, such as by providing a user interface for configuring policies and viewing log data. The data plane is generally responsible for managing data, such as by performing packet processing and session handling.

Suppose a device 406 attempts to access a server 420 using an encrypted session protocol, such as SSL. Network processor 506 is configured to receive packets from device 406, and provide the packets to data plane 504 for processing. Flow 508 identifies the packets as being part of a new session and creates a new session flow. Subsequent packets will be identified as belonging to the session based on a flow lookup. If applicable, SSL decryption is applied by SSL decrypter 510, and similarly traffic can be encrypted using SSL encrypter 516. Otherwise, processing by SSL decrypter 510 is omitted. Application identification (App-ID) component 512 is configured to determine what type of traffic the session involves and to identify a user associated with the traffic flow. For example, App-ID 512 can recognize a GET request in the received data and conclude that the session requires an HTTP decoder (e.g., to decode a web session in this example). For each type of protocol that can be decoded by data appliance 102, there exists a corresponding decoder 514. In one embodiment, the application identification is performed by an application identification component (e.g., App-ID engine) shown as App-ID 512, and a user identification is performed by another function/engine (e.g., a User-ID engine can be provided as another component of data appliance 102). Based on the determination made by App-ID 512, the packets are sent to an appropriate decoder 514. Decoder 514 is configured to assemble packets (e.g., which may be received out of order) into the correct order, perform tokenization, and extract out information. Decoder 514 also performs signature matching to determine what should happen to the packet. Processed packets can then be forwarded to a destination (e.g., depending on the applied policy (522)) using forward component 518.

As also shown in FIG. 5, agent and scan reports for devices on the enterprise network are received and stored in the management plane 502 in agent and scan reports 520. For example, the agent and scan reports can include the device profile data collected and reported to the data appliance as similarly discussed above with respect to FIG. 4. As another example, the agent and scan reports can also include network scan survey data resulting from executing a network scanning tool on the target network (e.g., a subnet of the target network) as similarly discussed above with respect to FIG. 3. In one embodiment, policy enforcement using device profile data based on policies 522 is applied as described herein with respect to various embodiments based on the monitored, identified, and decoded session traffic flows.

For example, based on a policy configured in policies 522 (e.g., which can include a honey network policy as discussed above), malware destined to a target device during a web session can be sent to the cloud security service along with device profile data for the target device and network scan survey data for the target enterprise network to implement an intelligent detonation of the malware in the honey network environment, such as described above with respect to FIG. 4. As another example, based on a policy configured in policies 522 (e.g., applying a honey network policy configured for the enterprise network), malware destined to a target device via email can be sent to the cloud security service along with device profile data for the target device and network scan survey data for the target enterprise network to implement an intelligent detonation of the malware in the honey network environment, such as further described below with respect to FIG. 7.

Example Honey Network with a Synchronized Configuration to Reflect a Target Network Environment to Implement Virtual Clones of Clients and Servers of the Target Network FIG. 6 is a block diagram illustrating an example honey network with a synchronized configuration to reflect a target network environment to implement virtual clones of selected devices of the target network in accordance with some embodiments. For example, a high-fidelity cloned environment can be generated to emulate one or more devices in the target network environment using techniques described herein. In an example implementation, synchronizing a honey network configuration to reflect a target network environment to implement virtual clones of selected target devices can be performed on an appliance or a computing device that is locally connected to or in local network communication with the target enterprise network (e.g., performed using a device that is also a member of the target enterprise network). In another example implementation, synchronizing a honey network configuration to reflect a target network environment to implement virtual clones of selected target devices can be performed using a cloud security service, such as shown in FIG. 6 and further described below.

As shown, a target enterprise network 610 includes a data appliance 102A and various other devices, which can include a plurality of different clients or host devices, such as various clients, shown as Client A 611 through Client X 612. The target network can also include a plurality of different servers and/or other devices, shown as Server A 614 through Server N 616 (e.g., network devices, printers, servers, etc.). Each of these devices can be configured with a deployed agent that executes on each device to collect various device profile data and communicate various device profile data to data appliance 102A and/or 102B, such as similarly described above. Data appliance 102A and/or 102B can store such device profile data locally or using an external data store, such as similarly described above. For example, data appliance 102A can send device profile data (e.g., for one or more devices) to data appliance 102B of a cloud security service 622 (e.g., using a secure communication protocol, such as Internet Protocol Security (IPsec) or another secure protocol) over Internet 618 (e.g., such communications can be performed upon request, periodically, based on an event, or using various other push and/or pull communications that can be triggered based on various events, such as described below).

As also shown in FIG. 6, cloud security service 622 can include a VM server 624 that can execute virtual clones of one or more of the selected devices of target enterprise network 610. In this example, a virtual clone of Client A 611 is instantiated and executed as Virtual Client A 626, a virtual clone of Client X 612 is instantiated and executed as Virtual Client X 628, a virtual clone of Server A 614 is instantiated and executed as Virtual Server A 630, and a virtual clone of Server N 616 is instantiated and executed as Virtual Server N 632, which can be implemented using the various techniques described herein to clone a device based on the device profile data collected and received from each agent executed on each device. For example, assuming Client A is assigned IP address 10.0.1.101 (ACME/Alice) and configured with Microsoft Windows® 7 Patch X, Microsoft Office® 2010, Oracle Java® 1.6, and Adobe Acrobat Reader 9.3.3 (e.g., and/or various other applications and/or configuration settings, such as described above), then Virtual Client A can be configured as a VM instance executing on the VM server that is assigned IP address 10.0.2.101 (ACME/Alice) and configured with Microsoft Windows® 7 Patch X, Microsoft Office® 2010, Oracle Java® 1.6, and Adobe Acrobat Reader 9.3.3 (e.g., and/or various other applications and/or configuration settings, such as described above) in order to clone Client A in the honey network. Assuming Client X is assigned IP address 10.0.1.102 (ACME/Bob) and configured with Microsoft Windows® 7 Patch Z, Microsoft Office® 2007, Oracle Java® 1.7, and Adobe Acrobat Reader 11 (e.g., and/or various other applications and/or configuration settings, such as described above), then Virtual Client X can be configured as a VM instance executing on the VM server that is assigned IP address 10.0.2.102 (ACME/Bob) and configured with Microsoft Windows® 7 Patch Z, Microsoft Office® 2007, Oracle Java® 1.7, and Adobe Acrobat Reader 11 (e.g., and/or various other applications and/or configuration settings, such as described above) in order to clone Client X in the honey network. As another example, assuming Server A is a web server (e.g., or another type of server, such as an LDAP/active directory server, DNS server, file server, and/or other types of servers, and/or other types of devices such as network devices, printers, etc.), then Virtual Server A can be configured as a VM instance executing on the VM server that is assigned an identical IP address and configured with matching OS and application software and versions (e.g., and/or various other applications and/or configuration settings, such as described above) in order to clone Server A in the honey network. Assuming Server N is a mail server, then Virtual Server A can be configured as a VM instance executing on the VM server that is assigned an identical IP address and configured with matching OS and application software and versions (e.g., and/or various other applications and/or configuration settings, such as described above) in order to clone Server N in the honey network.

Intelligent detonation of malware in a virtual clone of a target device can be performed using the honey network illustrated in this example by using the various techniques described herein. For example, a use case scenario of performing intelligent detonation of malware destined to a target device via a web download in the honey network environment is described above with respect to FIG. 4. An example use case scenario of performing intelligent detonation of malware destined to a target device via email in the honey network environment will now be described below with respect to FIG. 7.

Intelligent Detonation of Malware Delivered Via Email in a Virtual Clone of the Target Device in the Honey Network As an example use case scenario, the honey network can be used to intelligently detonate malware sent to a target device (e.g., a client) via email (e.g., malware embedded in the email and/or as an attachment to the email, such as a file sent as an email attachment, which is also generally referred to herein as malware email). In this example use case scenario, techniques are disclosed for determining which target device(s) is associated with an email recipient of the malware email. As similarly described above, once the target device is identified, a virtual clone can be instantiated in the VM environment to facilitate intelligent detonation of the malware email using the virtual clone of the target device (e.g., the device(s) associated with the user that was the intended recipient of the malware email) in the honey network.

Figure 7:
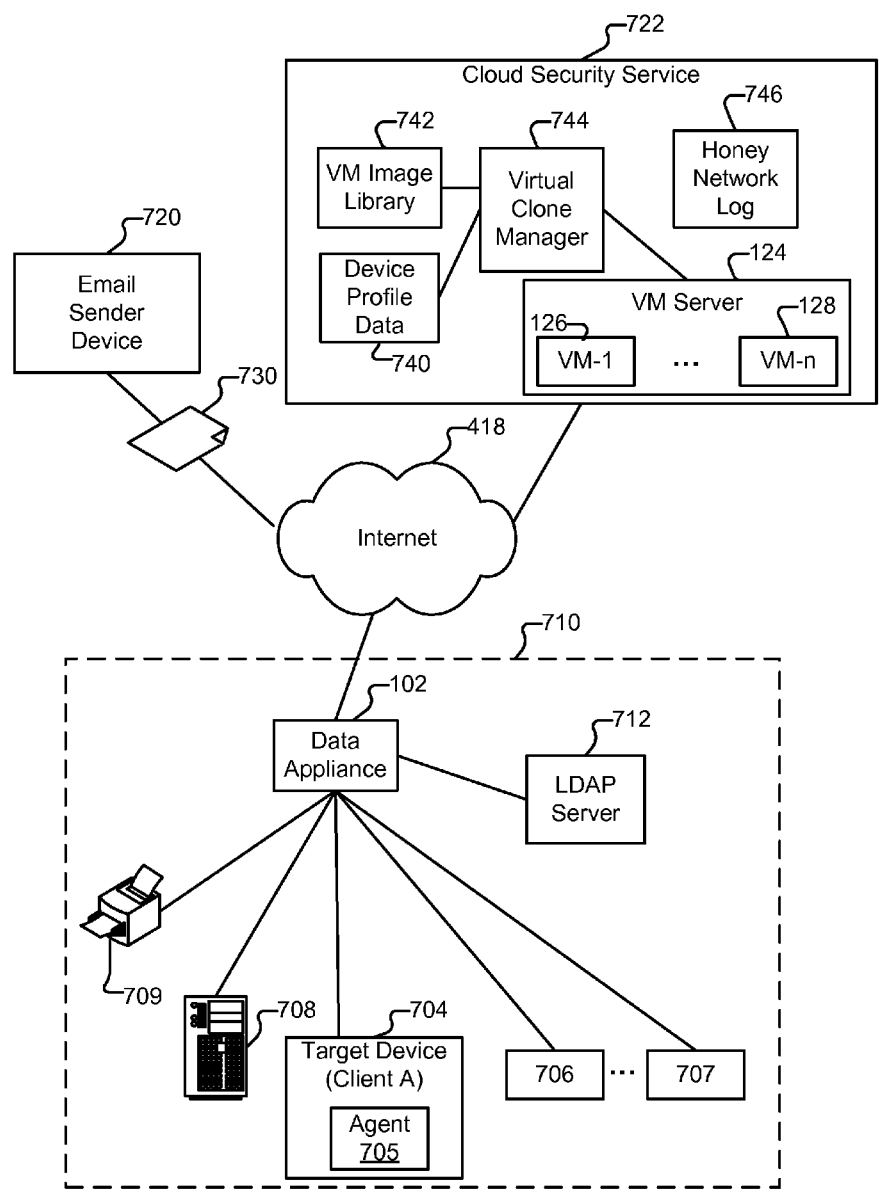
FIG. 7 is a block diagram illustrating an example use case scenario in which the honey network can be used to intelligently detonate malware sent to a target device via email in accordance with some embodiments.

FIG. 7 is a block diagram illustrating an example use case scenario in which the honey network can be used to intelligently detonate malware sent to a target device via email in accordance with some embodiments. For example, if a user, such as Bob, is a recipient of an email that is determined to be a malware email, then a virtual clone of Bob's client device can be instantiated in the instrumented VM environment provided by the cloud security service. The malware email (e.g., or a copy of the malware email) can also be sent to the cloud security service (e.g., this can be performed by the data appliance based on a honey network policy configured for the data appliance for the enterprise network). The malware email can then be opened using the malware client and/or application to open an attachment (e.g., based on file/MIME type) to facilitate an intelligent detonation of the malware email using the virtual clone of Bob's client device in the honey network.

In this example use case scenario, assume that Target Device (Client A) 704 is a device associated with a user that is an intended recipient of an email 730 from email sender device 720. As shown, Target Device (Client A) 704 is executing an agent 705, such as described above. In this example, email 730 is determined to be a malware email based on a policy applied by data appliance 102 (e.g., based on a security analysis of email content, such as a link, script, and/or other content in the email, and/or an attachment of email). In an example implementation, the data appliance can be deployed/located southbound of any anti-spam filter(s) used for the enterprise network for filtering spam email to avoid noise for performing these more advanced security techniques such that these more advanced security techniques can be focused on handling emails that would more likely reach hosts of intended recipients (e.g., would not typically be filtered or blocked by common anti-spam techniques). Based on a honey network policy configured for data appliance 102, the malware email is selected for further analysis using a cloud security service 722. As further described below, the malware email is sent to the cloud security service to facilitate intelligent detonation in a honey network performed by the cloud security service.

As further described below, the destination of the malware email can then be used to select the target device that can be cloned as a virtual clone in the honey network using various techniques described herein. For example, the virtual clone can be configured as a VM instance 126 or 128 executed on VM server 124 that is configured with attributes associated with that target device (e.g., device type, OS and version, applications and versions, OS/application patch levels, services, IP address, configuration settings, device state, etc.). As similarly described above, device profile data 740 can be used to select and/or configure a VM image from VM image library 742 to instantiate and configure such a virtual clone using virtual clone manager 744. As an example, device profile data for target device 704 can be collected and reported using a locally executed device agent. As also shown, enterprise network 710 can include various other client devices such as 706 through 707 and various other devices, such as a server 708 and a printer 709.

In one embodiment, various techniques are disclosed for determining a destination (e.g., one or more target devices)

of the malware email that is to then be used to select the target device that can be cloned as a virtual clone in the honey network using various techniques described herein. In particular, if an email is determined to be potential malware or malware—a malware email as determined using the data appliance in this example use case scenario, then the email can be further analyzed to determine an email address of an intended recipient(s) of the email. In an example implementation, determining a destination (e.g., one or more target devices) of the malware email includes parsing email header data of the malware email to extract a destination email address(es). As further described below, the extracted recipient email address(es) can then be used to determine a user ID and IP mapping(s) for a device(s) (e.g., client device(s), in some cases, a given user can have a plurality of devices that are configured to access the enterprise network and to access email sent to the user) associated with the user ID(s) and IP address(es). As a result, the user ID and IP mapping(s) can then be used to select the target device(s) as the device(s) that are configured with such IP address(es). In some cases, if the user is associated with multiple target devices that can be used to access the malware email, then one or more (e.g., a subset or all) of such multiple target devices can be selected for cloning and each can be used for intelligent detonation for further security analysis and threat intelligence of the malware email as further discussed below (e.g., as such malware can behave differently based on the device environment emulated by each different virtual clone corresponding to such target devices).

Referring to FIG. 7, data appliance 102 is also in communication with a Lightweight Directory Access Protocol (LDAP) server 712 (e.g., providing various directory services). For example, LDAP can be used to search an email directory for enterprise network 710 for a user ID for a particular email address. Various commercial, freeware, or open source LDAP services (e.g., Apache Directory Server, Microsoft Active Directory®, Apple Open Directory, Open-LDAP, etc.) exist that can be used to implement the LDAP server. In this example, data appliance 102 can communicate a request to LDAP server 710 for any user ID(s) (e.g., domain user name on enterprise network 710 associated with that email address) associated with the recipient email address(es) of the malware email. The LDAP server can then return any such user ID(s). In another example implementation, a replicated LDAP directory can be maintained by data appliance 102 to perform such lookup operations locally using the data appliance. Also, in this example, data appliance 102 is a next generation firewall that maintains user ID to IP address mapping data. As a result, the returned user IDs can be used by data appliance 102 to determine any IP address(es) associated with these user ID(s). For example, the data appliance can maintain a table that includes IP address(es) associated with each domain user (e.g., recent IP addresses can be stored based on a configuration setting and/or storage size available for such data), which can include time stamps for the last time that IP address was used by the user for sending and/or receiving email (e.g., this can also be used to prioritize which devices associated with the user to clone for performing the intelligent detonation of the malware email).

As such, an IP address of device(s) associated with the user name of the intended recipients is determined. The IP address(es) can then be used to identify the target device(s) associated with the user that is the intended recipient of the malware email. In some cases, a user can have multiple devices that are on the target network (e.g., a desktop computer, a laptop, a tablet, and/or a smart phone that can each be used to receive and access email directed to the user's email address). In such cases, one or more (e.g., or all) of the devices associated with the user can be cloned for detonating the email malware sample potentially using each of such virtual clones for security analysis and threat intelligence of the email malware sample as further discussed below.

The target device(s) can then be selected for cloning in the honey network to facilitate intelligent detonation of the malware email. In this case, the email malware sample can then be detonated in the virtual clone of Client A in the VM environment. At this point, behavior, including network and/or other activities, can be monitored and logged using a honey network log 746. For example, the intelligent detonation of the email malware sample in the virtual client of the target Client A can be monitored to detect, for example, C&C network traffic, which can be correlated to the malware sample. As a result, once such C&C network traffic is correlated with that malware sample, if actual clients in the target network, such as one of Bob's actual devices (e.g., desktop computer, laptop, tablet, smart phone, etc.), then such can be determined to be a host that was infected by that email malware. Similarly, this would also be applicable to other clients in the target network (e.g., a device that is associated with another user, such as Alice) that are associated with such C&C network traffic.

In this example use case scenario in which the honey network is used to intelligently detonate malware sent to a target device via email, threat intelligence can be gathered by performing such intelligent detonation of the malware using one or more of the virtual clones of the target device(s) using the honey network in the instrumented VM environment. For example, call-back communication (e.g., C&C traffic communications) from the malware can be observed in the instrumented VM environment. If matching C&C traffic communications are later observed in the actual enterprise network (e.g., observed using various network traffic monitoring techniques performed by data appliance 102 for enterprise network 710), then such C&C traffic communication activity can be associated with that malware sample (e.g., the malware email in this example use case scenario) detonated on the target host cloned in the VM environment. As a result, this facilitates correlation of various malware samples (e.g., such as the malware email in this example use case scenario) with the C&C traffic activity and also facilitates additional security analysis. For example, the C&C traffic indicates network traffic activity that can be analyzed including IP addresses and URLs extracted/associated with such C&C traffic, and other hosts in communication with similar C&C traffic in the actual enterprise network. Also, the malware analysis using the honey network and/or such additional analysis can be used to generate a signature for that malware email as malware associated with such malware activities (e.g., C&C traffic and/or other malware or undesirable activities). As another example, these techniques can be used to determine which client devices or other endpoints are the patient zero of the C&C traffic, which provides for additional threat intelligence (e.g., from email, sender and receiver such as based on email headers that include the sender email address and receiver email address(es), history of mail server to mail server traffic, reuse of email addresses that can be detected, and/or other data/information that can be extracted from the email that was correlated with that C&C activity(ies)). In addition, these techniques can be used to determine which client devices or other endpoints have been exposed to the malware (e.g., received the email) such that these devices can be remediated using various malware remediation techniques. As yet another example, these techniques can be used to examine other email header data, such as x-mailers and/or patterns in email address extensions used by, for example, APT attacker(s).

Other Use Case Scenarios for Intelligent Detonation of Malware Using a Virtual Clone of a Target Device in the Honey Network As another use case scenario, assume that an advance threat (e.g., an APT attacker) attacks a target end point in the enterprise network that network/security admins do not usually check/consider as targets, such as a printer or a network device (e.g., an unpatched network device such as a router). For example, an advanced threat can stay resident in printer memory of a printer to monitor any document that is sent to the printer for printing, copying, and/or faxing. Such an advanced threat can also use the printer memory for storing data that is being exfiltrated from that printer device or another device on the enterprise network, using the printer memory as a storage device that would be less likely to be detected by typical security/network techniques looking for such intrusions/APT activities, etc. Using the above described techniques, if malware is detected using such an advanced threat detected on a target end point, then the malware can similarly be intelligently detonated in a virtual clone of the target endpoint in the honey network to facilitate threat intelligence gathering as similarly described above with respect to other use case scenarios such as malware downloaded via the web and malware email.

Threat Forensics, Intelligence Reporting, and Protections

In one embodiment, during/after the completion of analysis of a malicious event or malware sample by the virtual honey network (honeynet) environment, all instrumented data collected from the VM hosts and VM manager are processed to deliver any/all of the following: (1) an alert to the operator indicating that malicious activity has occurred that requires the attention of the security response team; (2) a technical forensics report of the incident describing in detail all events observed on the VM hosts and the virtual honey network, including, for example, all host-based and network-based artifacts that might be present in a stand-alone sandbox forensics reports (e.g., WildFire® from Palo Alto Networks or other security service related products), such as modified files, Windows registry changes, network requests, behavioral summary, etc., for each host that was "touched" during the analysis timeframe by the attacker, presented as a timeline of events; and (3) host-based and network-based protections (e.g., host-based or network-based signatures) or indicators of compromise that can be used by the operator to detect the same or similar attack/attacker on the real production network.

Example Components of a Virtual Clone Manager

Figure 8:
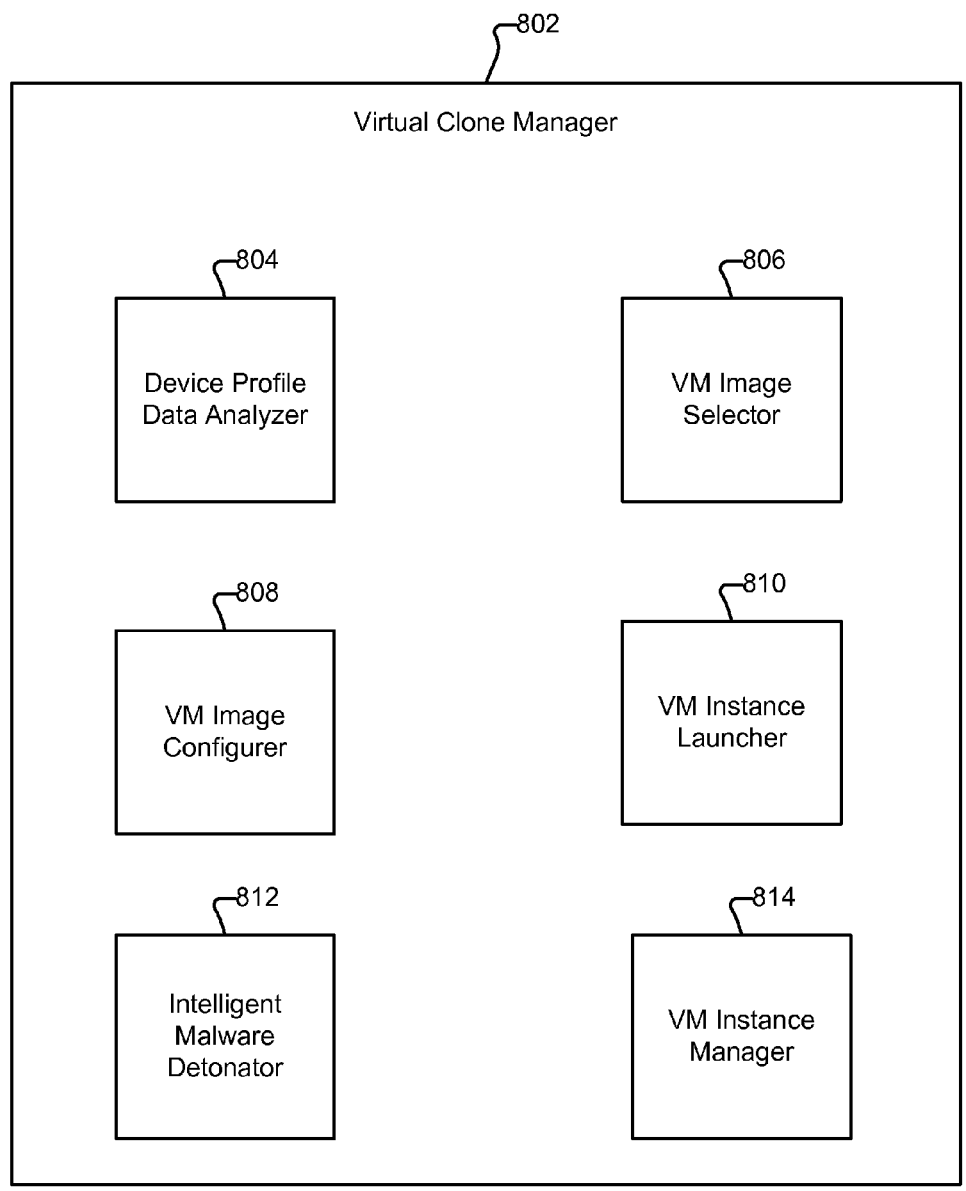
FIG. 8 is a block diagram illustrating example components of a virtual clone manager for implementing a honey network in accordance with some embodiments.

FIG. 8 is a block diagram illustrating example components of a virtual clone manager for implementing a honey network in accordance with some embodiments. For example, the virtual clone manager can be used to facilitate the various above-described use case scenarios for facilitating intelligent detonation of malware in/using a virtual clone on a honey network, such as described above. In an example implementation, the virtual clone manager is implemented as a component of the cloud security service that facilitates intelligent detonation of malware in a honey network, such as described above.

Referring to FIG. 8, a virtual clone manager 802 includes a device profile data analyzer 804. For example, the device profile data analyzer can retrieve device profile data (e.g., from a device profile data store (shown as 440 in FIGS. 4 and 740 in FIG. 7)) for a selected target device and extract any or all of the device profile data, which can be used for selecting a VM image.

VM image selector 806 receives the device profile data for the selected target device from device profile data analyzer 804 and uses that processed device profile data to select an appropriate VM image (e.g., from VM image library data store (shown as 442 in FIGS. 4 and 742 in FIG. 7)). For example, if a VM image that has the same OS and version (e.g., a Microsoft Windows® 7 image) is present in the VM library, then that VM image can be selected. In some cases, VM images are present in the VM library that match a variety of different combinations of OS and version combinations (e.g., and in some cases, patch levels) and, in some implementations, preexisting VM images may be present in the VM library that also have various combinations of application software and versions (e.g., and in some cases, patch levels) installed (e.g., in some scenarios, a set of VM images are created and stored in the VM library to account for common base image configurations that are used for one or more enterprise networks that are supported for these honey network configuration techniques).

VM image configurer 808 automatically configures the selected VM image as selected by the VM image selector 806 to be configured with various other software version/patch configurations and/or other configuration settings to be synchronized with the device profile data for the target device using the device profile data provided by device profile data analyzer 804. Example other software version/patch configurations and/or other configuration settings and device state to be synchronized with the device profile data for the target device can include installed OS including version and patches, installed applications including version and patches, and/or any other relevant host and network artifacts (e.g., logged in user name, configured domain controller, DNS, assigned IP address, browser proxy settings, configured local time zone, installed OS/application language packs (e.g., English, Japanese, Chinese, and/or other language packs installed on the OS platform), time since last reboot, network session logs, and/or other attributes of the client/device).

VM instance launcher 810 launches (e.g., instantiates and executes on a VM server (124)) the configured and selected VM image in an instrumented VM environment to generate a virtual clone of the target device in a honey network that has attributes that are synchronized with the attributes of the target device on the enterprise network, in which one or more other devices of the target network can also be reflected using virtual clones that similarly have attributes that are synchronized with the attributes of their corresponding actual devices in the target enterprise network. For example, the configured and selected VM image can be instantiated and executed as a VM instance on a VM server (e.g., a VM instance 126 or 128 on a VM server 124).

Intelligent malware detonator 812 detonates a malware sample in a virtual clone of the target device using the honey network. For example, the virtual clone can be executed in the instrumented VM environment to facilitate intelligent detonation of malware using the virtual clone, such as described above with respect to various use case scenarios.

VM instance manager 814 performs various additional virtual clone management functions. For example, the VM instance manager can select one or more virtual clones for modifications of one or more attributes to maintain synchronization with the attributes of their respective corresponding devices in the actual target enterprise network. As another example, the VM instance manager can select one or more virtual clones for removing from the VM environment (e.g., if the malware emulation has been completed, based on a honey network policy for such honey network activities for intelligent malware detonation, such as a time criteria, computing resource criteria, and/or other criteria, and/or if the corresponding actual device has been removed from the target enterprise network).

Whenever the virtual clone manager is described as performing a task, a single component, a subset of components, or all components of the virtual clone manager may cooperate to perform the task. Similarly, whenever a component of the virtual clone manager is described as performing a task, a subcomponent may perform the task and/or the component may perform the task in conjunction with other components. In various embodiments, portions or all of the virtual clone manager components are implemented in software executed on a processor (e.g., of a computing device or appliance, such as software implemented in Java, C++, Python, or another programming language). In various embodiments, portions or all of the virtual clone manager components are implemented in hardware (e.g., an ASIC, FPGA, and/or other programmable hardware components). Depending on factors such as the amount of computing resources available to the virtual clone manager, various logical components and/or features of the virtual clone manager may be omitted and the techniques described herein adapted accordingly. Similarly, additional logical components/features can be added to the virtual clone manager as applicable.

Example Components of a Malware Email Selector

Figure 9:
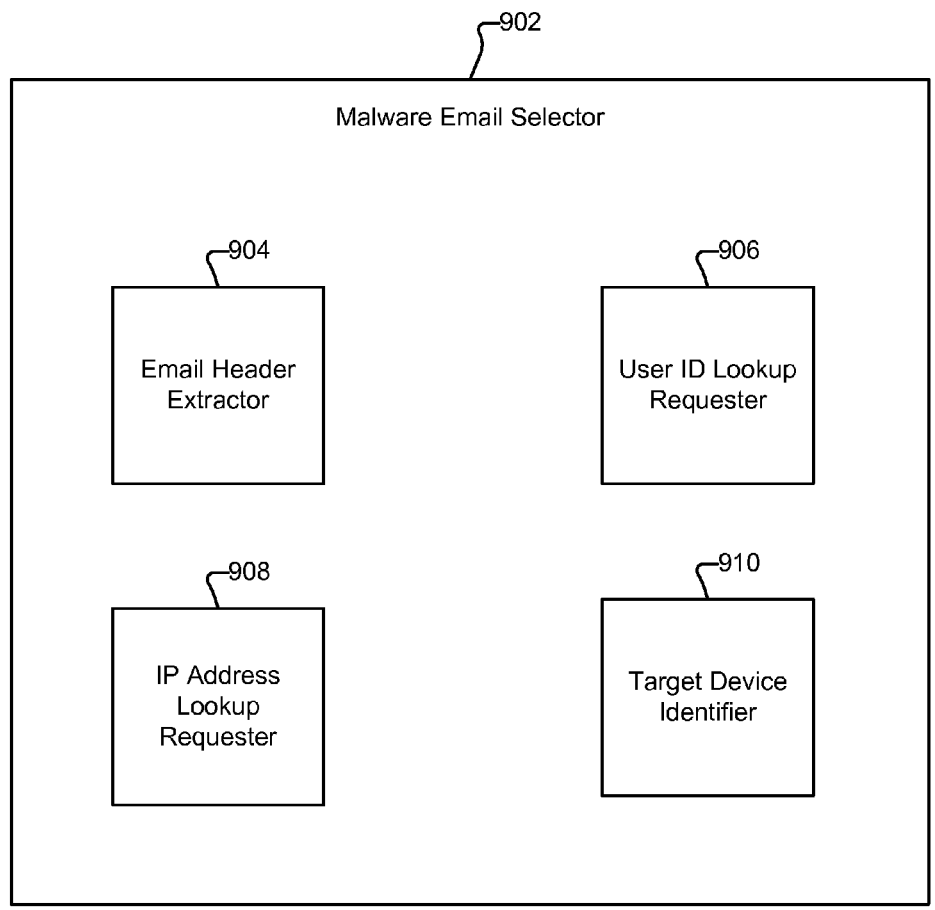
FIG. 9 is a block diagram illustrating example components of a malware email selector for implementing a honey network in accordance with some embodiments.

FIG. 9 is a block diagram illustrating example components of a malware email selector for implementing a honey network in accordance with some embodiments. For example, the malware email selector can be used to facilitate the various above-described use case scenarios for facilitating intelligent detonation of malware email in/using a virtual clone on a honey network, such as described above with respect to FIG. 7. In an example implementation, the malware email selector is implemented as a component of a data appliance (e.g., data appliance 102) that facilitates intelligent detonation of malware email in a honey network, such as described above.

Referring to FIG. 9, a malware email selector 902 includes an email header extractor 904. For example, the email header extractor can extract destination/recipient email address(es) (e.g., to and/or cc/bcc email address recipients). In some cases, the email header extractor can also extract the sender email address.

User ID lookup requester 906 receives the extracted destination/recipient email address(es) from email header extractor 904 and uses the extracted destination/recipient email address(es) to perform a user ID lookup operation. For example, the user ID lookup operation can be performed by requesting such a user ID lookup based on the extracted destination/recipient email address(es) from an LDAP server (shown as 712 in FIG. 7) and/or performing a local lookup operation using a local replication of the LDAP directory such as described above with respect to FIG. 7. In return, a user ID(s) (e.g., user domain name(s)) is received for the extracted destination/recipient email address(es).

IP address lookup requester 908 receives the user ID(s) from email header extractor 904 and uses the user ID(s) to perform an IP address lookup operation. For example, the IP address lookup operation can be performed using a table that includes a mapping of user IDs with IP addresses such as described above with respect to FIG. 7. In return, an IP address (e.g., one or more recent IP addresses) is received for the requested user ID(s).

Target device identifier 910 uses the IP address(es) to identify a target device(s) that is associated with the user that is an intended recipient of the malware email (e.g., a client device that the user has recently used to retrieve email). For example, the target device identifier can select the target device that is to be cloned such that a virtual clone of the target device is provided in a honey network that has attributes that are synchronized with the attributes of the target device on the enterprise network, in which one or more other devices of the target network can also be reflected using virtual clones that similarly have attributes that are synchronized with the attributes of their corresponding actual devices in the target enterprise network.

Whenever the malware email selector is described as performing a task, a single component, a subset of components, or all components of the malware email selector may cooperate to perform the task. Similarly, whenever a component of the malware email selector is described as performing a task, a subcomponent may perform the task and/or the component may perform the task in conjunction with other components. In various embodiments, portions or all of the malware email selector components are implemented in software executed on a processor (e.g., of a computing device or appliance, such as software implemented in Java, C++, Python, or another programming language). In various embodiments, portions or all of the malware email selector components are implemented in hardware (e.g., an ASIC, FPGA, and/or other programmable hardware components). Depending on factors such as the amount of computing resources available to the malware email selector, various logical components and/or features of the malware email selector may be omitted and the techniques described herein adapted accordingly. Similarly, additional logical components/features can be added to the malware email selector as applicable.

Figure 10:
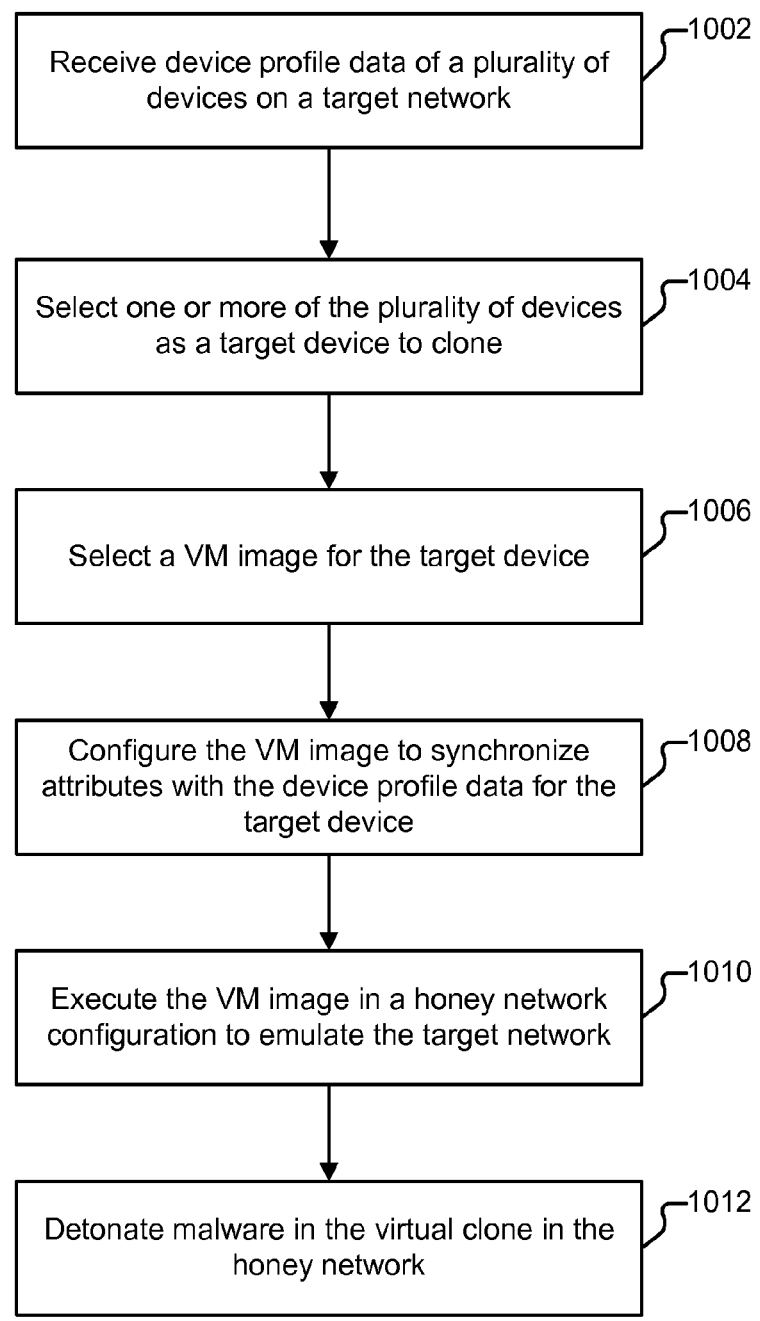
FIG. 10 is a flow diagram illustrating a process for synchronizing a honey network configuration to reflect a target network environment to implement a virtual clone of one or more target devices in accordance with some embodiments.

Example Process for Synchronizing a Honey Network Configuration to Reflect a Target Network Environment to Implement a Virtual Clone of One or More Target Devices FIG. 10 is a flow diagram illustrating a process for synchronizing a honey network configuration to reflect a target network environment to implement a virtual clone of one or more target devices in accordance with some embodiments. In one embodiment, process 1000 is performed by malware analysis system 132. In one embodiment, process 1000 is performed by cloud security service 422 (e.g., and implemented using virtual clone manager 802). The process begins at 1002 when device profile data of a plurality of devices on a target network (e.g., the device profile data can be collected and reported using the various techniques disclosed herein, such as described above with respect to FIG. 4) is received.

At 1004, one or more of the plurality of devices is selected as a target device to a clone. For example, a device that is a target of malware (e.g., malware received from a web download, malware received via an email, and/or other malware delivery/target scenarios) can be selected for cloning in the honey network to facilitate intelligent malware detonation. As another example, another device that is in likely or recent/past communication with such a target device in the enterprise network can also be selected for cloning to provide for a more realistic honey network environment such as discussed above.

At 1006, a VM image for the target device is selected. For example, based on one or more attributes in the device profile data for the target device (e.g., analyzed using device profile data analyzer 804), an appropriate VM image can be selected (e.g., using VM image selector 806) from a VM library such as described above.

At 1008, the VM image is configured to synchronize attributes with device profile data attributes for the target device in the enterprise network. For example, the VM image can be configured (e.g., using VM image configurer 808) to synchronize attributes with device profile data attributes for the target device in the enterprise network.

At 1010, the VM image is executed in a honey network configuration to emulate the target network. For example, the configured VM image is instantiated and executed in an instrumented VM environment (e.g., using VM instance launcher 810) that is executing a plurality of virtual clones that are synchronized with corresponding devices in the enterprise network environment.

At 1012, malware is detonated in the virtual clone in the honey network. For example, malware destined or previously executed on the target device can be sent to the instrumented VM environment and opened in the corresponding virtual clone of the target device to facilitate an intelligent detonation of the malware in a virtual clone of the target device in the honey network (e.g., using intelligent malware detonator 812). The detonated malware can be monitored in the instrumented VM environment and such monitored activities can be logged (e.g., using honey network log 746). An example process for intelligent detonation of malware email will now be described.

Figure 11:
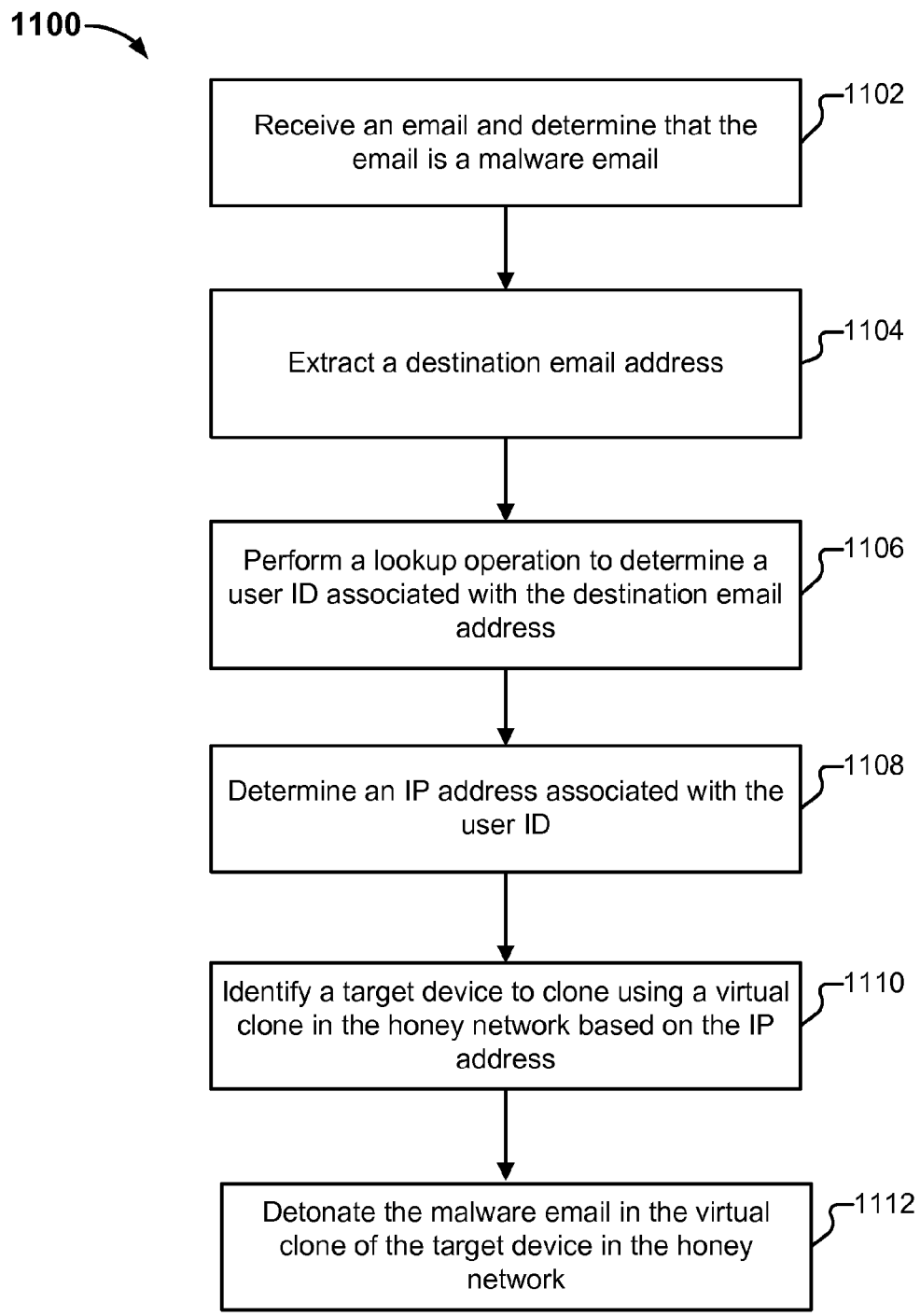
FIG. 11 is a flow diagram illustrating a process for intelligently detonating malware sent to a target device via email in accordance with some embodiments.

Example Process for Intelligent Detonation of Malware Delivered Via Email in a Virtual Clone of the Target Device in the Honey Network FIG. 11 is a flow diagram illustrating a process for intelligently detonating malware sent to a target device via email in accordance with some embodiments. In one embodiment, process 1100 is performed by malware analysis system 132 (e.g., using malware email selector 902). In one embodiment, process 1100 is performed by cloud security service 722 (e.g., using malware email selector 902). The process begins at 1102 when an email is received and determined to be a malware email (e.g., at an inline data appliance that can perform a security analysis of the email to determine that content of the email or an attachment to the email is malware or suspicious).

At 1104, a destination email address is extracted. For example, a destination email address(es) can be extracted from an email header of the malware email (e.g., using email header extractor 904).

At 1106, a lookup operation is performed to determine a user ID(s) associated with the destination email address(es). For example, a user ID lookup operation can be performed by requesting such a user ID lookup based on the extracted destination/recipient email address(es) from an LDAP server (shown as 712 in FIG. 7) and/or performing a local lookup operation using a local replication of the LDAP directory such as described above with respect to FIG. 7 (e.g., using user ID lookup requester 906). In return, a user ID(s) (e.g., user domain name(s)) is received for the extracted destination/recipient email address(es).

At 1108, an IP address(es) associated with the user ID(s) is determined. For example, the IP address lookup operation can be performed using a table that includes a mapping of user IDs with IP addresses such as described above with respect to FIG. 7 (e.g., using IP address lookup requester 908). In return, an IP address (e.g., one or more recent IP addresses) is received for the requested user ID(s).

At 1110, a target device to clone using a virtual clone in the honey network based on the IP address is identified. For example, the target device to be cloned can be identified (e.g., using target device identifier 910) such that a virtual clone of the target device is provided in a honey network that has attributes that are synchronized with the attributes of the target device on the enterprise network, in which one or more other devices of the target network can also be reflected using virtual clones that similarly have attributes that are synchronized with the attributes of their corresponding actual devices in the target enterprise network At 1112, malware email is detonated in the virtual clone in the honey network. For example, the malware email destined or previously executed on the target device can be sent to the instrumented VM image and opened in the corresponding virtual clone of the target device to facilitate an intelligent detonation of the malware email in a virtual clone of the target device in the honey network (e.g., using intelligent malware detonator 812). The detonated malware can be monitored in the instrumented VM environment and such monitored activities can be logged (e.g., using honey network log 746).

As will now be apparent from the above-described example process for intelligent detonation of malware email, various other use case scenarios for intelligent malware detonation in a virtual clone in a honey network executed in an instrumented VM environment can be provided to facilitate various threat intelligence and detection as described herein. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for dynamic selection and generation of detonation location of suspicious content with a honey network, comprising:
   a computer comprising a processor and further comprising:
   a VM instance launcher executed on the processor that launches a first virtual clone in the honey network of a target device of a plurality of devices in an enterprise network, wherein a malware sample received from the enterprise network was destined for the target device, and wherein the first virtual clone has one or more attributes that are synchronized with one or more attributes of the target device in the enterprise network so that the malware sample would detect that the virtual clone has previously observed and/or expected attributes associated with the target device, and wherein the VM instance launcher executed on the processor dynamically launches a second virtual clone in the honey network of a second device of the plurality of devices in the enterprise network based on one or more logged interactions between the target device and the second device in the enterprise network that were logged using an agent executed on the target device wherein the second virtual clone in the honey network is instantiated to emulate the second device in the enterprise network to facilitate interactions in the honey network between the first virtual clone that corresponds to the target device and the second virtual clone that corresponds to the second device;
   a virtual machine (VM) instance manager executed on the processor that manages a plurality of virtual clones including the first virtual clone and the second virtual clone executed in an instrumented VM environment, wherein the plurality of virtual clones executed in the instrumented VM environment correspond to the honey network that emulates the plurality of devices including the target device in the enterprise network, and wherein each of the plurality of virtual clones in the honey network have one or more attributes that are synchronized with one or more attributes of a corresponding device of the plurality of devices in the enterprise network; and an intelligent malware detonator executed on the processor that receives at the honey network the malware sample from the enterprise network, wherein the malware sample includes suspicious content, and wherein the malware sample was destined for the targeted device of the plurality of devices in the enterprise network, and the intelligent malware detonator detonates the malware sample in the first virtual clone of the plurality of virtual clones executed in the instrumented VM environment, and wherein one or more activities of the detonated malware sample are monitored in the instrumented VM environment and logged in a honey network log.

2. The system recited in claim 1, wherein the plurality of virtual clones are executed in the instrumented VM environment on a VM server.

3. The system recited in claim 1, wherein in at least one of the plurality of virtual clones is a customized VM image that is executed in the instrumented VM environment.

4. The system recited in claim 1, wherein the suspicious content is downloaded from a web site.

5. The system recited in claim 1, wherein the suspicious content is a malware email.

6. The system recited in claim 1, further comprising:
receive an email and determine that the email is a malware email, wherein the suspicious content is the malware email.

7. The system recited in claim 1, wherein the suspicious content is a malware email, further comprising:
an email header extractor that extracts a destination email address from the malware email.

8. The system recited in claim 1, wherein the suspicious content is a malware email, and wherein the malware email is associated with a destination email address, further comprising:
a user identifier (ID) lookup requester that performs a lookup operation to determine a user ID associated with the destination email address.

9. The system recited in claim 1, wherein the suspicious content is a malware email, wherein the malware email is associated with a destination email address, and wherein the destination email address is associated with a user identifier (ID), further comprising:
an IP address lookup requester that determines an IP address associated with the user ID.

10. The system recited in claim 1, wherein the suspicious content is a malware email, wherein the malware email is associated with a destination email address, wherein the destination email address is associated with a user identifier (ID), and wherein the user ID is associated with an IP address, further comprising:
a target device identifier that identifies the target device in the enterprise network to clone using the first virtual clone in the honey network based on the IP address.

11. A method of dynamic selection and generation of detonation location of suspicious content with a honey network, comprising:
launching a first virtual clone in the honey network of a target device of a plurality of devices in an enterprise network, wherein a malware sample received from the enterprise network was destined for the target device, and wherein the first virtual clone has one or more attributes that are synchronized with one or more attributes of the target device in the enterprise network so that the malware sample would detect that the virtual clone has previously observed and/or expected attributes associated with the target device;

dynamically launching a second virtual clone in the honey network of a second device of the plurality of devices in the enterprise network based on one or more logged interactions between the target device and the second device in the enterprise network that were logged using an agent executed on the target device wherein the second virtual clone in the honey network is instantiated to emulate the second device in the enterprise network to facilitate interactions in the honey network between the first virtual clone that corresponds to the target device and the second virtual clone that corresponds to the second device;

managing a plurality of virtual clones including the first virtual clone and the second virtual clone executed in an instrumented VM environment, wherein the plurality of virtual clones executed in the instrumented VM environment correspond to the honey network that emulates the plurality of devices including the target device in the enterprise network, and wherein each of the plurality of virtual clones in the honey network have one or more attributes that are synchronized with one or more attributes of a corresponding device of the plurality of devices in the enterprise network;

receiving at the honey network the malware sample from the enterprise network, wherein the malware sample includes suspicious content, and wherein the malware sample was destined for the targeted device of the plurality of devices in the enterprise network; and detonating the malware sample in the first virtual clone of the plurality of virtual clones executed in the instrumented VM environment, and wherein one or more activities of the detonated malware sample are monitored in the instrumented VM environment and logged in a honey network log.

12. The method of claim 11, wherein the plurality of virtual clones are executed in the instrumented VM environment on a VM server.

13. The method of claim 11, wherein in at least one of the plurality of virtual clones is a customized VM image that is executed in the instrumented VM environment.

14. The method of claim 11, wherein the suspicious content is downloaded from a web site.

15. The method of claim 11, wherein the suspicious content is a malware email.

16. A computer program product for dynamic selection and generation of detonation location of suspicious content with a honey network, the computer program product being embodied in a non-transitory computer readable storage medium and comprising computer instructions for:
launching a first virtual clone in the honey network of a target device of a plurality of devices in an enterprise network, wherein a malware sample received from the enterprise network was destined for the target device, and wherein the first virtual clone has one or more attributes that are synchronized with one or more attributes of the target device in the enterprise network so that the malware sample would detect that the virtual clone has previously observed and/or expected attributes associated with the target device;

dynamically launching a second virtual clone in the honey network of a second device of the plurality of devices in the enterprise network based on one or more logged interactions between the target device and the second device in the enterprise network that were logged using an agent executed on the target device wherein the second virtual clone in the honey network is instantiated to emulate the second device in the enterprise network to facilitate interactions in the honey network between the first virtual clone that corresponds to the target device and the second virtual clone that corresponds to the second device;

managing a plurality of virtual clones including the first virtual clone and the second virtual clone executed in an instrumented VM environment, wherein the plurality of virtual clones executed in the instrumented VM environment correspond to the honey network that emulates the plurality of devices including the target device in the enterprise network, and wherein each of the plurality of virtual clones in the honey network have one or more attributes that are synchronized with one or more attributes of a corresponding device of the plurality of devices in the enterprise network;

receiving at the honey network the malware sample from the enterprise network, wherein the malware sample includes suspicious content, and wherein the malware sample was destined for the targeted device of the plurality of devices in the enterprise network; and detonating the malware sample in the first virtual clone of the plurality of virtual clones executed in the instrumented VM environment, and wherein one or more activities of the detonated malware sample are monitored in the instrumented VM environment and logged in a honey network log.

17. The computer program product recited in claim 16, wherein the plurality of virtual clones are executed in the instrumented VM environment on a VM server.

18. The computer program product recited in claim 16, wherein in at least one of the plurality of virtual clones is a customized VM image that is executed in the instrumented VM environment.

19. The computer program product recited in claim 16, wherein the suspicious content is downloaded from a web site.

20. The computer program product recited in claim 16, wherein the suspicious content is a malware email.

21. The system recited in claim 1, wherein the VM instance launcher executed on the processor dynamically launches a third virtual clone in the honey network of a third device of the plurality of devices in the enterprise network based on one or more logged interactions between the target device and the third device in the enterprise network that were logged using the agent executed on the target device wherein the third virtual clone in the honey network is instantiated to emulate the third device in the enterprise network to facilitate interactions in the honey network between the first virtual clone that corresponds to the target device and the third virtual clone that corresponds to the second device, wherein the third device corresponds to a printer, a router, a directory server, a DNS server, a file share server, an email server, a web server, or a proxy server in the enterprise network.

22. The system recited in claim 1, wherein the VM instance launcher executed on the processor dynamically launches a third virtual clone in the honey network of a third device of the plurality of devices in the enterprise network based on a requested interaction from the first virtual clone in the honey network to the third device in the enterprise network that were logged using the agent executed on the target device wherein the third virtual clone in the honey network is instantiated to emulate the third device in the enterprise network to facilitate interactions in the honey network between the first virtual clone that corresponds to the target device and the third virtual clone that corresponds to the third device.

* * * * *

UNITED STATES PATENT AND TRADEMARK OFFICE
CERTIFICATE OF CORRECTION

PATENT NO. : 9,882,929 B1
APPLICATION NO. : 14/503129
DATED : January 30, 2018
INVENTOR(S) : Ettema et al.

It is certified that error appears in the above-identified patent and that said Letters Patent is hereby corrected as shown below:

On the Title Page

Item (56), Column 2 references cited, foreign patent documents, delete
"WO 2008054952 8/2008" and insert --WO 2008054952 5/2008-- therefor.

Signed and Sealed this
Eighth Day of May, 2018

Andrei Iancu
*Director of the United States Patent and Trademark Office*